US007936171B2

(12) United States Patent
Hu et al.

(10) Patent No.: US 7,936,171 B2
(45) Date of Patent: May 3, 2011

(54) BALUNS, A FINE BALANCE AND IMPEDANCE ADJUSTMENT MODULE, A MULTI-LAYER TRANSMISSION LINE, AND TRANSMISSION LINE NMR PROBES USING SAME

(75) Inventors: Jianping Hu, Arlington, MA (US); Judith Herzfeld, Newton, MA (US)

(73) Assignee: Brandeis University, Waltham, MA (US)

( * ) Notice: Subject to any disclaimer, the term of this patent is extended or adjusted under 35 U.S.C. 154(b) by 219 days.

(21) Appl. No.: 12/313,385

(22) Filed: Nov. 20, 2008

(65) Prior Publication Data

US 2009/0140824 A1 Jun. 4, 2009

Related U.S. Application Data

(60) Provisional application No. 60/989,494, filed on Nov. 21, 2007.

(51) Int. Cl.
*G01V 3/00* (2006.01)

(52) U.S. Cl. ........................................ 324/322; 324/318

(58) Field of Classification Search .......... 324/300–322; 333/25, 26, 32, 174, 175, 177, 109, 132, 333/134; 336/200, 232; 455/323; 343/787
See application file for complete search history.

(56) References Cited

U.S. PATENT DOCUMENTS 2,171,219 A * 8/1939 Malter .......................... 333/263
4,682,125 A * 7/1987 Harrison et al. ................ 333/12
5,144,240 A 9/1992 Mehdizadeh et al.
6,217,790 B1 4/2001 Onizuka et al.
6,278,340 B1 * 8/2001 Liu ................................ 333/26
6,320,385 B1 * 11/2001 Burl et al. ...................... 324/322
6,380,742 B1 * 4/2002 Stringer et al. ............... 324/322
6,531,943 B2 * 3/2003 Niu et al. ....................... 336/182
6,686,741 B2 * 2/2004 Hasegawa ...................... 324/322
6,750,652 B2 6/2004 Weyers et al.
6,750,752 B2 * 6/2004 Werlau .......................... 336/229
6,922,108 B2 * 7/2005 Lin ................................ 330/301
6,933,725 B2 * 8/2005 Lim et al. ....................... 324/322
6,956,188 B2 * 10/2005 de Rooij et al. ............... 219/619
7,135,866 B2 * 11/2006 Weiss et al. ................... 324/322
7,420,423 B2 * 9/2008 Lee et al. ....................... 330/301
7,755,447 B2 * 7/2010 Oshima ........................... 333/26
2005/0275403 A1 * 12/2005 Pinkerton et al. ............. 324/318

OTHER PUBLICATIONS

Chow et al., "An Accurate Method to Measure The Antenna Impedance of a Portable Radio", Microwave and Optical Technology Letters, vol. 23, No. 6, Dec. 20, 1999, pp. 349-350.
Fu et al., "Ultra-wide bore 900 MHz high-resolution NMR at the National High Magnetic Field Laboratory", Journal of Magnetic Resonance, 177, 2005, Elsevier, Inc., pp. 1-8.
Icheln et al., "Use of Balun Chokes in Small-Antenna Radiation Measurements", IEEE Transactions on Instrumentation and Measurement, vol. 53, No. 2, Apr. 2004, pp. 498-506.
Marchand, Nathan, "Transmission-Line Conversion", Electronics, vol. 17, Dec. 1944, pp. 142-145.

(Continued)

*Primary Examiner* — Brij B Shrivastav
(74) *Attorney, Agent, or Firm* — Iandiorio Teska & Coleman

(57) ABSTRACT

A pseudo-Marchand balun, compound balun and tunable multi-resonant coaxial balun, and NMR probes employing each such balun, and a fine balance and impedance adjustment module and a multi-layer transmission line for use in such NMR probes.

35 Claims, 26 Drawing Sheets

OTHER PUBLICATIONS

Milligan, Thomas A., "Dipoles, Slots, and Loops", Modern Antenna Design, 2nd Ed., 2005, p. 256.
Oltman, George, "The Compensated Balun", IEEE Transactions on Microwave Theory and Techniques, vol. MTT-14, No. 3, Mar. 1966, pp. 112-119.
Paulson et al., "Cross polarization, radio frequency field homogeneity, and circuit balancing in high field solid state NMR probes", Journal of Magnetic Resonance, 171, 2004, Elsevier, Inc., pp. 314-323.
Qian et al., "Design and construction of a contactless mobile RF coil for double resonance variable angle spinning NMR", Journal of Magnetic Resonance, 188, 2007, Elsevier, Inc., pp. 183-189.
Rutkowski et al., "Wideband coaxial balun for antenna application", IEEE, 1998, pp. 389-392.
Vizmuller, Peter, RF Design Guide: Systems, Circuits and Equations, Artech House, Inc., 685 Canton Street, Norwood, MA 02062, 1995, p. 76.

* cited by examiner

40

210

BALUNS, A FINE BALANCE AND IMPEDANCE ADJUSTMENT MODULE, A MULTI-LAYER TRANSMISSION LINE, AND TRANSMISSION LINE NMR PROBES USING SAME

RELATED APPLICATIONS

This application claims benefit of and priority to U.S. Provisional Application Ser. No. 60/989,494 filed Nov. 21, 2007 incorporated herein by this reference.

GOVERNMENT RIGHTS

This invention was made with U.S. Government support under Grant No. 5 R01 EB001035 by the National Institute of Health. The Government has certain rights in the subject invention.

FIELD OF THE INVENTION

This invention relates to improvements in baluns, and to balanced, high field, multi-resonant, fully transmission line, nuclear magnetic resonance (NMR) probes utilizing them, and to a fine balance and impedance adjustment module and a multi-layer transmission line used in NMR probes.

BACKGROUND OF THE INVENTION

Baluns are circuit elements that provide balance-unbalance transformation and suppress common mode currents. Existing baluns are complicated, work for only one or two closely related channels, and are rarely efficient at high power. Existing baluns are of several types and have a variety of drawbacks.

Baluns consisting of discrete transmission lines, such as (a) The Quarter Wavelength Sleeve Balun [1. Y. L. Chow, K. F. Tsang, C. N. Wong, An Accurate Method To Measure The Antenna Impedance of A Portable Radio, Microwave and Optical Technology Letters, Volume 23 Issue 6, Pages 349-352, 1999], (b) The Half-Wavelength Balun [2. Modern Antenna Design, Second Edition, Thomas A. Milligan, ISBN10: 0471457760, John Wiley, 2005], and (c) the Marchand balun [RF Design Guides: Systems, Circuits and Equations, Peter Vizmuller, ISBN: 0-089006-754-6, Artech House, Inc., 1995; Rutkowski, T. Zieniutycz, W. Joachimowski, K. Gdansk Div., Wideband Coaxial Balun For Antenna Application, Microwaves and Radar, 1998. MIKON '98., 12th International Conference on, Volume 2, Pages 389-392, ISBN: 83-906662-0-0, 1998], are bulky and long, and are difficult to build and adjust because they require precise machining.

Transformer type baluns that contain ferrite cores or beads [Onizuka Masahiro, Sato Kouki, Balun Transformer Core Material, Balun Transformer Core and Balun Transformer, U.S. Pat. No. 6,217,790, 2001] are lossy, not suitable for very high power, and not suitable in magnetic fields (as in NMR and MRI). They are also subject to heating problems, saturation problems and stray couplings.

The air-core transformer type balun [Weiss Michel, Martinache Laurent, Gonella Olivier, Multifrequency Power Circuit and Probe and Spectrometer Comprising Such A Circuit, U.S. Pat. No. 7,135,866, 2006], needs precise alignment, is dependent on the resonance tuning of peripheral parts, and is subject to stray coupling.

Ferrite choke type baluns [Werlau Glenn, High Power Wideband Balun And Power Combiner/Divider Incorporating Such A Balun, U.S. Pat. No. 6,750,752, 2004] are lossy, not suitable for very high power, not suitable in magnetic fields (as in NMR and MRI) and subject to heating problems.

Air-core choke baluns [Burl Michael, Chmielewski Thomas, Braum William O., Multi-Channel Balun For Magnetic Resonance Apparatus, U.S. Pat. No. 6,320,385, 2001; Harrison William H., Arakawa Mitsuaki, Mccarten Barry M., RF Coil Coupling For MRI With Tuned RF Rejection Circuit Using Coax Shield Choke, U.S. Pat. No. 4,682,125, 1987] require an excessively large bending radius in the thick transmission lines required to handle very high power.

Transistor circuit baluns [Lee Young Jae, Yu Hyun Kyu, Active Balun Device, U.S. Pat. No. 7,420,423, 2008] are lossy, temperature sensitive, noisy and not suitable for high power applications.

Stripe line baluns, made from printed circuit board or laminate, [Niu Dow-chih, Chang Chi-yang, Lin Lih-shiang, Balun-Transformer, U.S. Pat. No. 6,531,943], are lossy, fragile, temperature sensitive, and not suitable for high power applications.

The dual band balun, comprising discrete transmission lines which can balance two working frequencies, [Clemens Icheln, Joonas Krogerus, and Pertti Vainikainen, Use of Balun Chokes in Small-Antenna Radiation Measurements, IEEE Transactions on Instrumentation and Measurement, Vol. 53, No. 2, pp. 498-506, 2004] has a mechanical tuning low pass filter that needs precise machining. Balancing the higher frequency requires changing the length of the balun. Furthermore, the two frequencies are closely related and cannot be adjusted independently. All of the above are incorporated by reference herein.

In some application such as communication antennas (including radio, television, wireless, and cell), common mode currents cause power loss, noise pick-up, and safety hazards. Baluns can improve efficiency and safety by suppressing the common mode currents. Multi-frequency baluns would allow antennas and other devices to operate efficiently and safely at multiple frequencies.

Nuclear magnetic resonance (NMR) spectroscopy (including magnetic resonance imaging—MRI) detects radio-frequency (RF) transitions between nuclear spin states. This requires delivery and detection of radio-frequency radiation by a coil around the sample. For multi-nuclear magnetic resonance, the coil must operate at multiple, disparate frequencies. And, to work well, it must be balanced at all these frequencies.

Sample coil imbalance reduces the homogeneity of the radiation, and thereby reduces excitation efficiency. Sample coil imbalance also causes signal loss and noise pick-up, resulting in poor signal-to-noise ratio. At high power, such as is required in solid state NMR, sample coil imbalance increases sample heating and arcing. Sample coil imbalance also compromises tuning and matching for salty or high dielectric samples. All of these effects of coil imbalance are greatly exacerbated at the high fields preferred in modern magnetic resonance spectroscopy.

Existing balanced NMR probes are either not fully transmission line or are balanced over only a narrow frequency range. By avoiding lump circuit elements, fully transmission line magnetic resonance probes achieve high efficiencies, reduced cross-talk between channels, and robust operation across a wide range of temperatures. Fully transmission line probes have the further advantages that (a) all the controls are in the bottom box which is outside the magnet and therefore accessible and always at room temperature, and (b) improved isolation between channels is possible through the design of common null points. However, in these probes, it is difficult to balance multiple channels at significantly different frequencies. A further challenge is conforming a fully transmission line probe to the dimensions of the NMR magnet and the associated facility, while maintaining balance, impedance matching and efficiency, especially over a multi-band (multi-frequency) operating range.

SUMMARY OF THE INVENTION

It is therefore an object of this invention to provide improvements in baluns which allow for improved fully transmission line NMR probes in which the sample coil can be balanced at all operating frequencies.

It is a further object of this invention to provide such improvements in the probe transmission lines featuring common null points to improve channel isolation and segmented transmission lines to improve transmission efficiency.

It is a further object of this invention to provide such improvements including three robust, efficient, high power baluns including:

a clusterable pseudo-Marchand balun which is easy to build, suitable for applications across a wide range of temperatures, and capable of full balance for one channel, a multi-band compound balun which is more compact, also suitable for applications across a wide range of temperatures, and capable of full balance across three or more channels, and a tunable multi-band coaxial balun which is the most compact, the easiest to build, and capable of full balance across three channels.

It is a further object of this invention to provide such improvements in which the compactness of the compound balun and tunable coaxial balun make them especially suitable for applications in narrow bore magnets and facilities with low ceilings.

It is a further object of this invention to provide baluns which enable NMR probes which can be sized to meet magnet and facility structure constraints and yet be balanced, impedance matched and efficient over a number of operating frequencies.

The invention results from the realization that improved baluns which can be balanced at all operating frequencies can be achieved in clusterable pseudo-Marchand baluns, multi-resonant compound baluns and multi-resonant tunable coaxial baluns, and that such improved baluns are uniquely suited to implement fully transmission line NMR probes in which the sample coil will be balanced at all operating frequencies and the further realization that balance and transmission efficiency can be further improved by using a fine balance and impedance adjustment module.

The subject invention, however, in other embodiments, need not achieve all these objectives and the claims hereof should not be limited to structures or methods capable of achieving these objectives.

This invention features an improved Marchand balun including a first defined length transmission line having a center conductor and a shield, and a second transmission line having a center conductor and a shield. One end of the center conductors provides a balanced output/input; the other end of the second transmission line center conductor provides the unbalanced input/output. The shield of each transmission line is connected to ground and a capacitor is interconnected between the other end of the first defined length transmission line and ground.

In preferred embodiments the defined wavelength transmission line may be less than ¼ wavelength. The defined wavelength transmission line may have a length greater than $$\left(\frac{n}{2}\right)\lambda$$

and less than $$\left(\frac{1}{4}+\frac{n}{2}\right)\lambda$$

where n is a whole number. There may be an in-line filter at the balanced output of said second transmission line.

This invention also features a compound balun including a transmission line system having a center conductor and at least three concentric shields forming a first transmission line between the center conductor and the first shield, a second transmission line between the first and second shields, and a third transmission line between the second and third shields. The first transmission line receiving unbalanced input/output has at least three multi-band frequency signals at one end and provides a multi-band balanced output/input at the other. The second and third transmission lines form a choke to suppress the common mode current in the shield of the first transmission line at high frequency.

In preferred embodiments there may be a fourth concentric shield forming a fourth transmission line between the third and fourth shields. There may be a first reactive load between the second and third transmission lines. The first reactive load may include first and second sections spaced from each other about the periphery of the second and third shields. The first and second sections may include a reactive transmission line having one end of its center conductor connected to one of the second and third shields and one end of its shield connected to the other of the second and third shields. The other ends of the reactive transmission line's shield and center conductor may be connected to a capacitor for adjusting the choke for middle and low frequencies, respectively. There may be a second reactive load between the third and fourth transmission lines. The second reactive load may include third and fourth sections spaced from each other about the periphery of the third and fourth shields. The third and fourth sections may include a reactive transmission line having one end of its center conductor connected to one of the third and fourth shields and one end of its shield connected to the other of the third and fourth shields. The other ends of the reactive transmission line's shield and center conductor may be connected to a capacitor for adapting the choke for low frequency. The space between the second and third shields may include a dielectric member. The space between the first and second shields may include a static dielectric member and a moveable dielectric member movable toward and away from the static dielectric member for adjusting the suppression of the common mode current at the highest frequency loads.

This invention further features a tunable multi-resonant coaxial balun including a segmented main transmission line having an unbalanced input at one end and one of the balanced output terminals at the other. There is an adjustable transmission line having an inner conductor and shield with at least one dielectric member movable to and fro longitudinally between the inner conductor and shield for defining at least two adjustable transmission lines sections and adjusting the dielectric constant thereof for varying the output impedance of the adjustable transmission line to match the output impedance of the main transmission line at high frequency.

In preferred embodiments there may be a number, n, of the dielectric members defining a number, up to n+1, of adjustable transmission line sections. There may be a first and second capacitor at the output ends of each transmission line and/or a third capacitor connected between the input end of the adjustable transmission line and ground for adjusting the adjustable transmission line to match the output impedance of the segmented main transmission line at lower frequency when there are two channels. There may be a low frequency trap and either an impedance module or a low frequency module, connected respectively to the bottom or top of the tunable balance module, for adjusting the output terminal at the top of tunable balance module to match the output impedance of the segmented main transmission line (along with the first and/or second capacitor at the output ends of the segmented main transmission line and adjustable transmission line) at the lowest frequency, when there are three channels.

This invention also features a pseudo-Marchand balun NMR probe including a base having at least one pseudo-Marchand balun, and a tuning and matching circuit associated with each pseudo-Marchand balun; and a probe body including a balanced pair of segmented main transmission lines at the proximate end interconnected with a sample coil at the distal end.

In preferred embodiments there may be in the base, common null point modules connected to each of the outputs of the at least one pseudo-Marchand balun. There may be in the probe body a fine balance and impedance adjustment module interconnected between the balanced pair of segmented main transmission lines and the sample coil. There may be a plurality of the pseudo-Marchand baluns and the pseudo-Marchand balun NMR probe may be multi-resonant. Each multi-resonant pseudo-Marchand balun may include a first defined length transmission line having a center conductor and a shield; and a second transmission line having a center conductor and a shield. One end of the center conductors may provide a balanced output/input. The other end of the second transmission line center conductor may provide the unbalanced input/output. The shield of each transmission line may be connected to ground and a capacitor may be interconnected between the other end of the first defined length transmission line and ground.

This invention further features a multi-resonant compound balun NMR probe including a base including at least one tuning and matching circuit and a probe body including a balanced pair of segmented main transmission lines interconnected to the at least one tuning and matching circuit, a multi-resonant compound balun connected to the main transmission line and a sample coil interconnected to the multi-resonant compound balun.

In a preferred embodiment the multi-resonant compound balun may include a transmission line system having a center conductor and at least three concentric shields forming a first transmission line between the center conductor and the first shield, a second transmission line between the first and second shields, and a third transmission line between the second and third shields. The first transmission line may receive unbalanced input/output at least three frequencies at one end and may provide a multi-band balanced output/input at the other. The second and third transmission lines may form a choke to suppress the common mode current in the shield of the first transmission line at high frequency. There may be in the base, a common null point module interconnected between the at least one tuning and matching circuit and the main transmission line. There may be in the probe body a fine balance and impedance adjustment module interconnected between the multi-resonant compound balun and the sample coil.

The invention further features a multi-resonant compound balun NMR probe having a base including at least one tuning and matching circuit, and a multi-resonant compound balun interconnected therewith. There is a probe body including a balanced pair of segmented main transmission lines at the proximate end and a sample coil at the distal end.

In preferred embodiments there may be a common null point module interconnected between the at least one tuning and matching circuit and the multi-resonant compound balun. There may be a transmission line extension in series between the common point module and the multi-resonant compound balun. There may be a fine balance and impedance adjustment module interconnected between the sample coil and the main transmission line. The multi-resonant compound balun may include a transmission line system having a center conductor and at least three concentric shields forming a first transmission line between the center conductor and the first shield, a second transmission line between the first and second shields, and a third transmission line between the second and third shields. The first transmission line may receive multi-band unbalanced input/output at one end and provide balanced output/input at least three frequencies at the other end. The second and third transmission lines may form a choke to suppress the common mode current in the shield of the first transmission line at high frequency.

This invention further features a multi-resonant tunable coaxial balun NMR probe having a base including at least one tuning and matching circuit and a probe body having a multi-resonant tunable coaxial balun connected to the at least one tuning and matching circuit at the proximate end and a sample coil at the distal end.

In preferred embodiment the multi-resonant tunable coaxial balun may include a segmented main transmission line having an unbalanced input at one end and one of the balanced output terminals at the other. There may be an adjustable transmission line having an inner conductor and shield with at least one dielectric member movable to and fro longitudinally between the inner conductor and shield for defining at least two balun transmission line sections and adjusting the dielectric constant thereof for varying the output impedance of the balun transmission line to match the output impedance of the main transmission line at high frequency. There may be in the base a common null point module interconnected between the at least one of the tuning and matching circuits and the multi-resonant tunable coaxial balun.

The invention also features a fine balance and impedance adjustment module including a pair of transmission line sections having the same or different characteristic impedances and having their shields connected together, a dielectric medium in each shield, a center conductor passing through the dielectric medium and snugly fit therein to permit movement and repositioning of the center conductor relative to the shields for adjustment of high frequency impedance and balance and a capacitor connected to each center conductor for adjusting lower frequency impedances and balances.

In a preferred embodiment the capacitors may be unequal. The capacitors may be variable.

The invention also features a multi-layer transmission line including an inner metal sleeve, an outer metal sleeve and a longitudinally aligned stack of metal (normally copper) disks that alternately make contact with the inner or outer sleeve of the transmission line, and are separated by dielectric material that makes contact with both sleeves.

In a preferred embodiment there may be a top coaxial transmission line section. There may also be an adjustable dielectric, which can be moved into and out of the top coaxial transmission line section to accomplish the fine adjustment of the electrical length.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
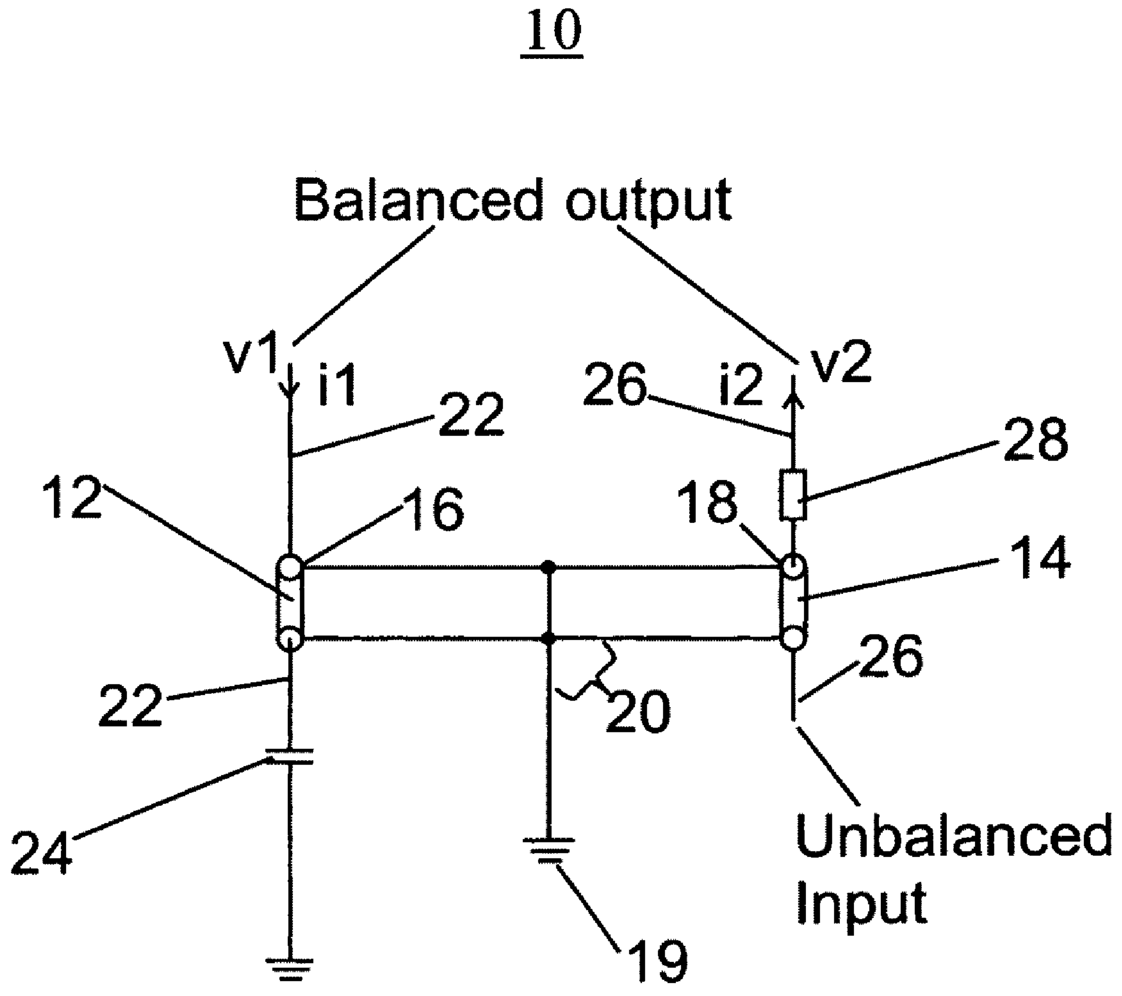
FIG. 1 is an electrical schematic view of a pseudo-Marchand balun according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
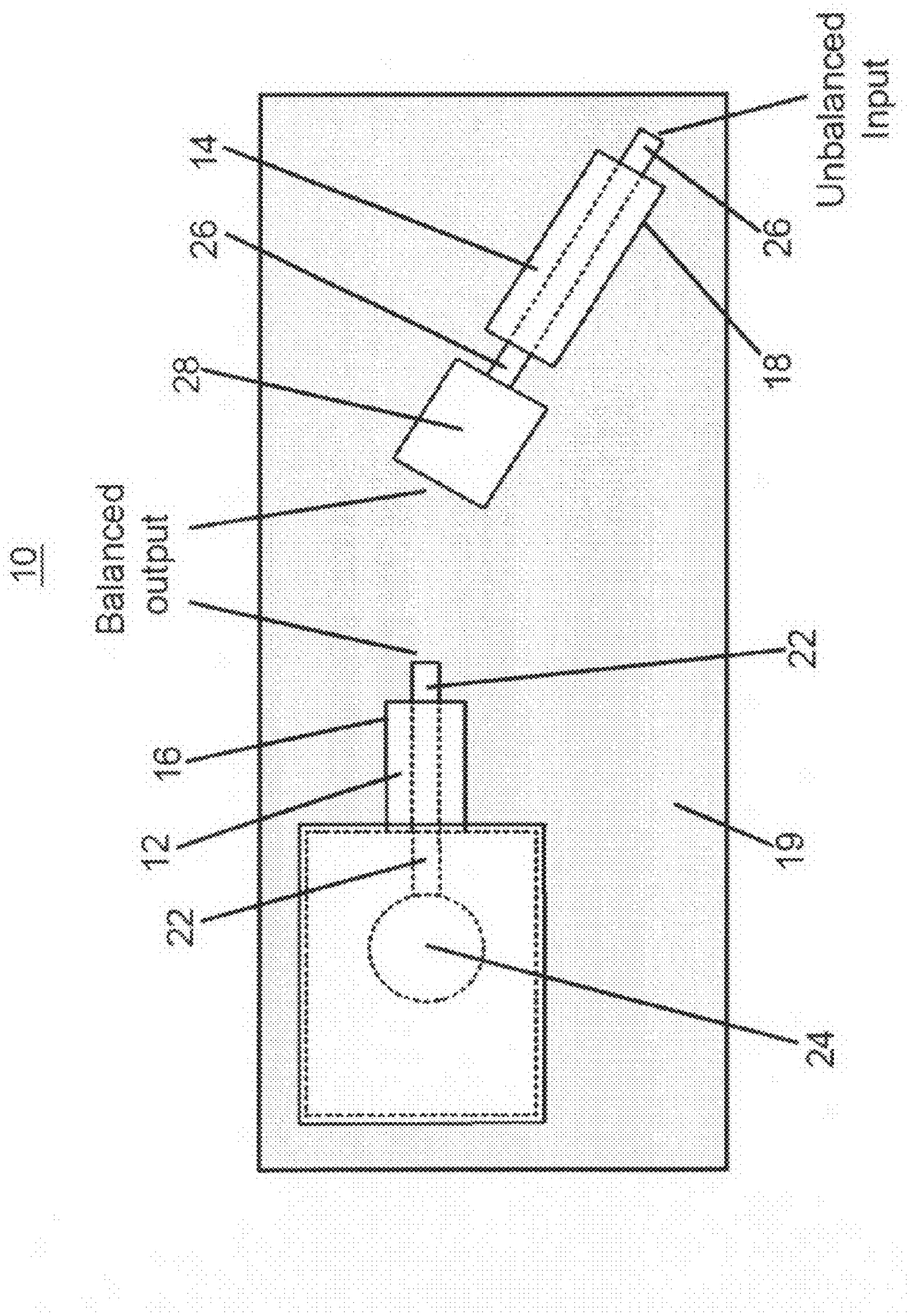
FIG. 2 is a mechanical diagrammatic plan view of the pseudo-Marchand balun of FIG. 1.
Figure 23:
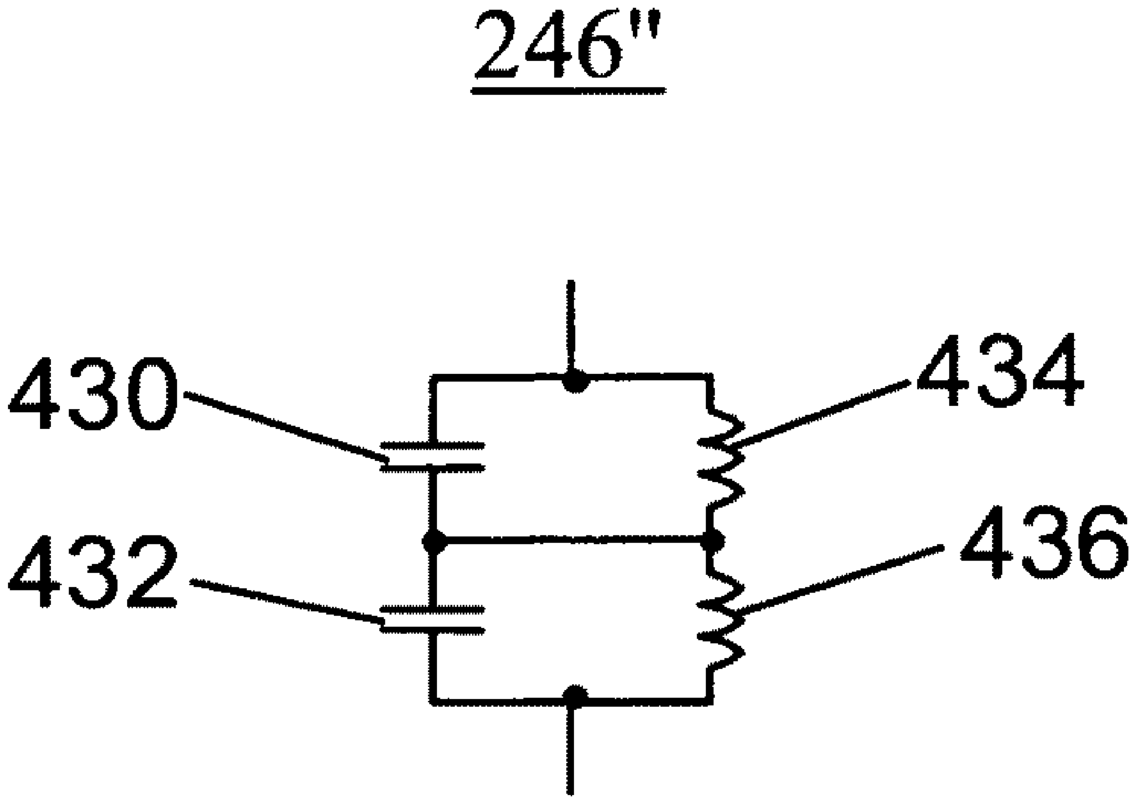
FIGS. 23 and 24 are electrical schematic views of common null point modules for four and five operating frequencies, respectively.
Figure 24:
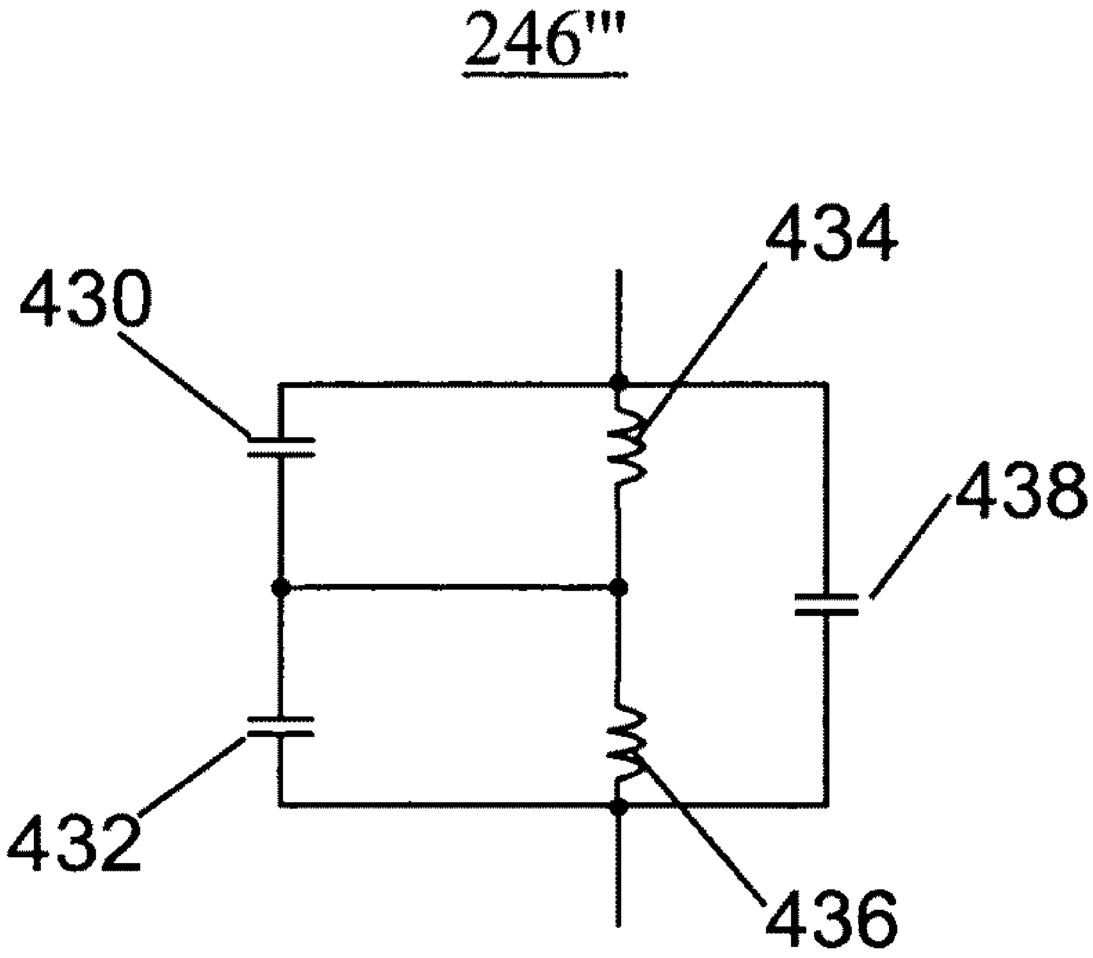

There is shown in FIGS. 1 and 2 an improved Marchand balun also referred to as a pseudo-Marchand balun 10 which in this embodiment includes a first transmission line 12 with a length of less than ¼ wavelengths and a second transmission line 14. The first transmission line 12 is of a length greater than $$\left(\frac{n}{2}\right)\lambda$$

and less than $$\left(\frac{1}{4}+\frac{n}{2}\right)\lambda,$$

where n is a whole number, including zero, and λ is wavelength. The shields 16 and 18 of transmission lines 12 and 14, respectively, are connected to ground 19 through lines 20. The center conductor 22 of transmission line 12 is connected to a capacitor 24 which may be a variable capacitor and has a capacitance which matches the impedance of the load. For example, for a load of 5 ohms at a frequency of 500 MHz, capacitance 24 may be approximately 1.5 pF. Center conductor 26 on transmission line 14 receives the unbalanced input and the balanced output occurs on center conductors 22 and 26. Although as shown the input is unbalanced and the output is balanced, the balun works as well having a balanced input at center conductors 22 and 26 with the unbalanced output appearing at center conductor 26. An in-line filter 28 may be provided to improve isolation between the improved Marchand baluns when multiple channels each require one. Typically it would be added to the channel with the poorest noise characteristic and positioned nearest to the common null point module which will be explained later with reference to FIGS. 22-24. The length of transmission line 12 or the capacitance of capacitor 24 can be adjusted for any given transmission line 14 in such a way that the reactance at the output ends of transmission lines 12 and 14 have the same amplitude (equal to half of the magnitude of the load impedance) but opposite in sign. Changing the length of transmission line 12 provides coarse adjustment and changing the capacitance of capacitor 24 provides fine adjustment. The transmission lines are typically about 100 mm in length and about 29 mm in diameter at a frequency of 500 MHz. Since the output currents i1 and i2 are then the same, the potentials v1 and v2 at the output ends of transmission lines 12 and 14 should also be of equal amplitude but opposite sign. The unbalanced input has thus been converted to balanced output or conversely. When several channels with different working frequencies are connected to the same load, it is necessary to keep them isolated. In that case, the load impedance is adjusted to be approximately zero (that is, a null point) at the connecting point for the various channels, as will appear subsequently in the discussion of FIGS. 8, 9, 10, 11 and 22-24.

Figure 3:
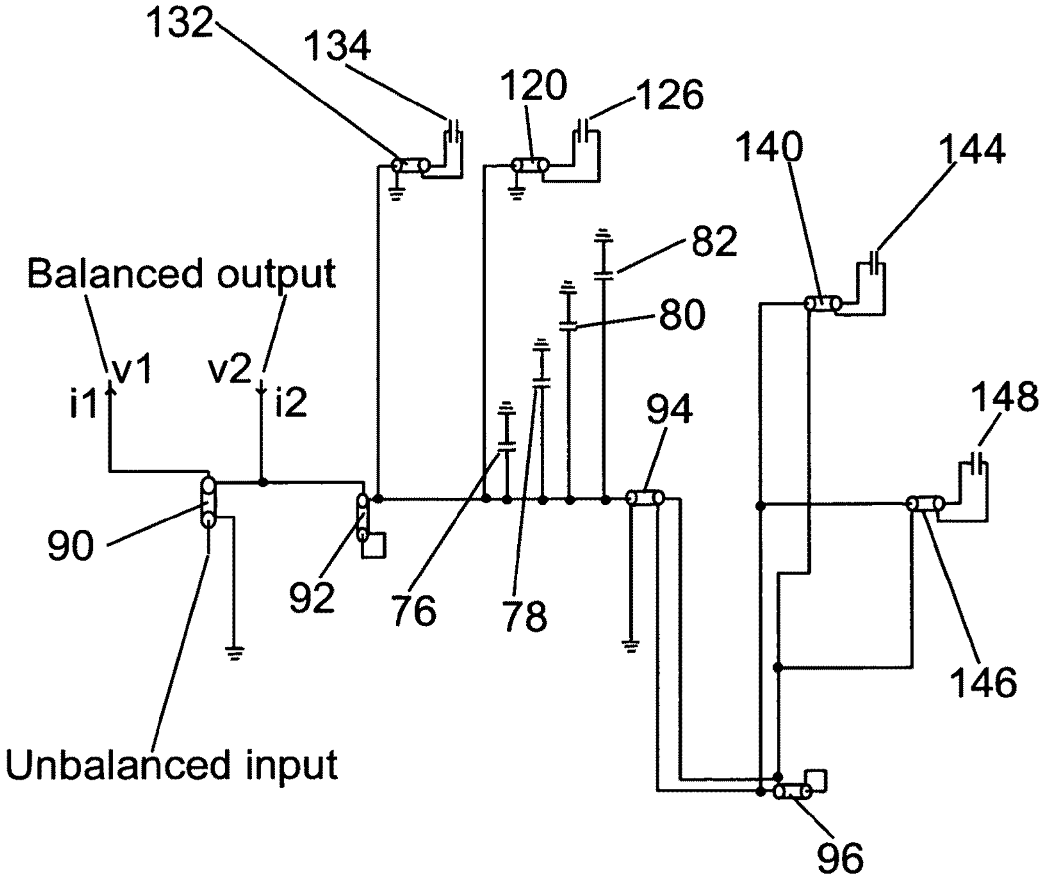
FIG. 3 is an electrical schematic view of a compound balun according to this invention.
Figure 4:
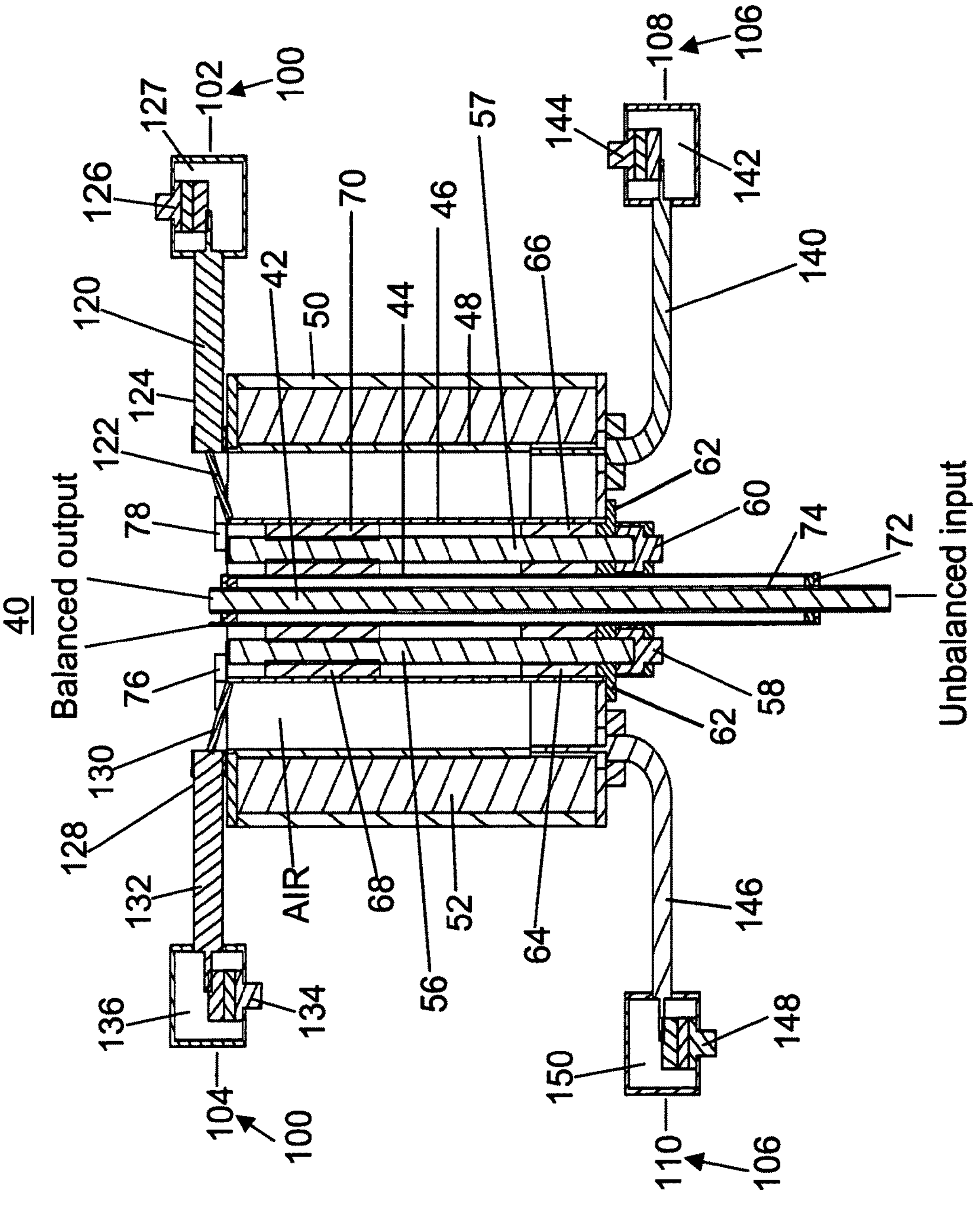
FIG. 4 is a mechanical diagrammatic cross-sectional elevational view of the balun of FIG. 3.

Another improved balun, a multi-resonant compound balun 40, is shown in FIGS. 3 and 4, including a center conductor 42 and at least three sleeves or shields 44, 46, and 48, in fact a fourth sleeve or shield 50 is also shown in the embodiment of FIGS. 3 and 4. Between sleeve 50 and sleeve 48 there is a dielectric 52 such as, for example Delrin, KelF, or PTFE. Between sleeves 48 and 46 there is typically air and between sleeves 46 and 44 there is air as well as one or more threaded dielectric rods, 56, 57 which can be turned by the dielectric rod knobs 58 and 60. There is a bottom or shorting plate 62 and accompanying each threaded dielectric rod 56 and 57 is a static dielectric member 64, 66 and a sliding dielectric member 68 and 70 with threaded holes. Only two threaded dielectric rods with accompanying static and sliding dielectrics are shown; there may be more. Center conductor 42 is surrounded by a spacer 72 and an insulating sleeve 74. Fixed chip capacitors 76, 78, and 80 and 82 not shown in FIG. 4 are mounted on top of balun 40.

Figure 4A:
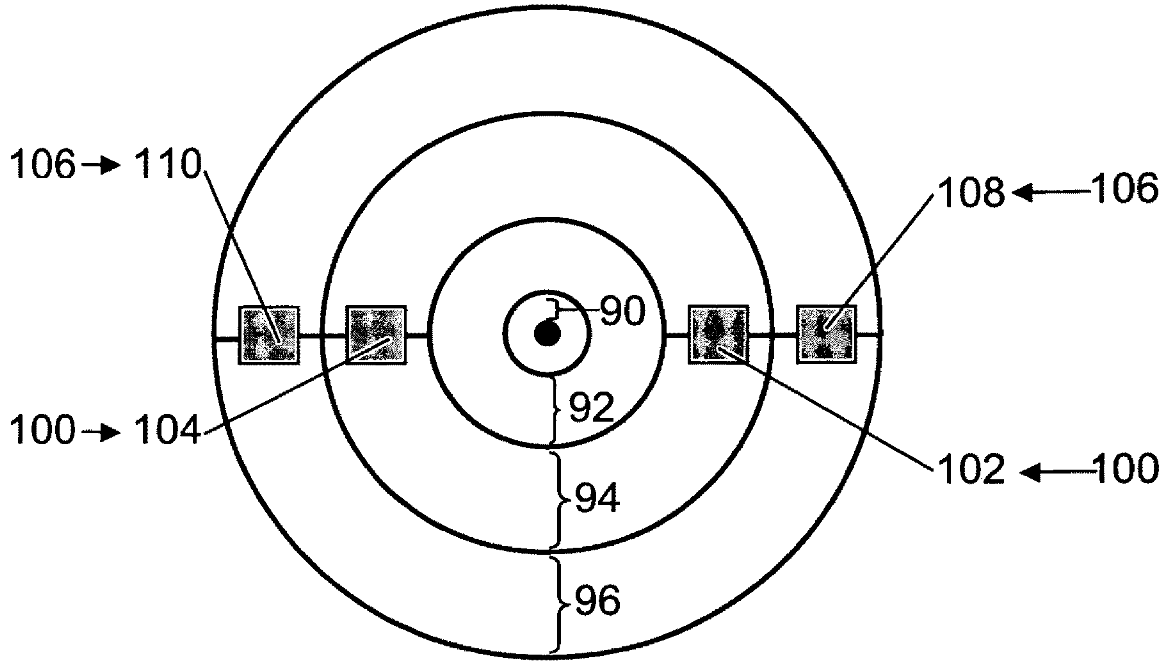
FIG. 4A is a schematic plan view of the balun of FIG. 4.

The inner surface of sleeve or shield 44 and the inner conductor 42 form transmission line 90, which receives the unbalanced input at one end and provides balanced power at the other end. The outer surface of shield 44 and inner surface of sleeve 46 form transmission line 92. The outer surface of shield 46 and the inner surface of shield 48 form transmission line 94 and the outer surface of shield 48 and the inner surface of shield 50 form transmission line 96. Compound balun 40 is a multi-resonant or multi-frequency or multi-band device. The compound balun 40 is in the nature of a chocking balun and it balances the output by suppressing the common mode current from flowing on the outer surface of the outer conductor or shield of transmission line 90. This very large impedance between the outer surface and ground is achieved independently at each frequency by different approaches. There is a first reactive load 100, FIG. 4A between the second shield 46 and third shield 48 in the form of first and second sections 102, 104 spaced from each other about the periphery of the second shield 46 and third shield 48 and spaced preferably as far apart around the periphery from each other as appropriate, for example, 180 degrees. There is a second reactive load 106, between the third and fourth shields 48, 50 in the form of third and fourth sections 108, 110 also spaced from each other about the periphery of the third and fourth shields 48, 50. The peripheral spacing for both of these reactive loads should be far enough to prevent interference and can be as much as 180 degrees. Reactive section 102 includes a transmission line 120 whose center conductor 122 and shield 124 are connected between the second and third shields 46 and 48 at their inner ends and at their outer ends are connected to capacitor 126 in enclosure 127. Similarly, reactive section 104 includes a transmission line 132 whose center conductor 130 and shield 128 are connected across second and third shields 46 and 48 at their inner ends and at their outer ends are connected to capacitor 134 in enclosure 136. Similarly, with respect to reactive load 106, reactive section 108 includes transmission line 140 whose shield and center conductor are connected at their inner ends between third and fourth shields 48 and 50 and at their outer ends are connected to capacitor 144 in enclosure 142. Reactive section 110 likewise includes a transmission line 146 whose center conductor and shield are connected to shields 48 and 50 at their inner ends and at their outer ends are connected to capacitor 148 in enclosure 150.

Choking at higher frequency is achieved by a quarter wave length resonator. Transmission line 92 is shorter than a quarter wave length with one end shorted by the bottom plate 62 and the other end grounded at the outer conductor. The dielectric in transmission line 92 comprises static pieces 64 and 66 and sliding pieces 68 and 70. The choking frequency decreases with increasing length of these two pieces. Fine tuning is achieved by adjusting the relative positions of the two pieces with threaded dielectric rods 56 and 57. The choking frequency will increase when the sliding pieces 68, 70 are moved closer to the static pieces 64, 66. This tuning is not affected by tuning for the lower frequency because transmission line 120 and capacitor 126 form a notch or band pass filter for the higher frequency. The four capacitors 76, 78, 80 and 82 have low impedance at high frequency and the outside transmission lines, transmission lines 94 and 96 are bypassed at higher frequency.

Choking at lower frequency is achieved by a band stop filter. The high reactance required for the filter is developed in steps with remote impedance tuning devices formed by pairs of transmission lines and capacitors, one end of transmission line 96 is shorted by the top plate and the length is adjusted to obtain a small positive reactance at the open end. Transmission line 146 and capacitor 148 and transmission line 140 and capacitor 144 form remote impedance tuning devices adjusted so that transmission lines 146 and 140 have negative reactances where they connect to transmission line 96. The parallel connections between transmission lines 96, 146, and 140 then forms a larger positive reactance after being transformed along transmission line 94. This positive reactance increases further at the opening of transmission line 94 where transmission line 132 and capacitor 134 form another remote impedance tuning device adjusted to have a negative reactance where it connects to the open end of transmission line 94. The band stop filter is then formed by connecting transmission line 94 and transmission line 132 in parallel with capacitors 76, 78, 80, and 82 and transmission line 120. Coarse tuning is accomplished by the choices of the capacitances 76, 78, 80, and 82 while fine tuning is accomplished by adjustments of the capacitances 148, 144, and 134. Reducing these capacitances increases the choking frequency. This tuning is not effected by tuning for the higher frequency because transmission line 120 and capacitor 126 have a very negative reactance at lower frequency and the positive reactance of transmission 92 at lower frequencies is negligible compared to the choking impedance. The values of capacitances 76, 78, 80, 82, 148, 144, 126, and 134 are 3.3 pF, 3.3 pF, 3.3 pF, 3.3 pF, 21 pF, 21 pF, 3.2 pF and 4 pF, respectively, for a balun operating in the vicinity of 500 MHz, 125 MHz. The shield and center conductor are approximately 4 inches in length and shield 50 has a diameter of 3.5 inches, while shields 48, 46 and 44 have diameters of 2.5, 1.25 and 0.375 inches respectively.

This compound balun can balance three channels without changing the configuration. The reactive section 110, including transmission line 146 and capacitor 148, is adjusted to form a notch or band pass filter for the middle frequency and transmission line 96 is bypassed at the middle frequency to keep the middle frequency channel balance isolated from the low frequency tuning. The band stop filter choking middle and low frequencies is then formed by connecting transmission line 94 and transmission line 132 in parallel with capacitors 76, 78, 80, and 82 and transmission line 120. Coarse tuning at the middle and low frequencies is accomplished by the choices of the capacitances 76, 78, 80, and 82. Then fine tuning at the middle and low frequencies is accomplished by adjustments of the capacitances 134 and 144, respectively. Reducing these capacitances increases the choking frequency.

Analogously, adding an extra sleeve, three notch filters and one or more reactive sections outside the above three channel compound balun can make a compound balun capable of balancing four or more channels.

Figure 5:
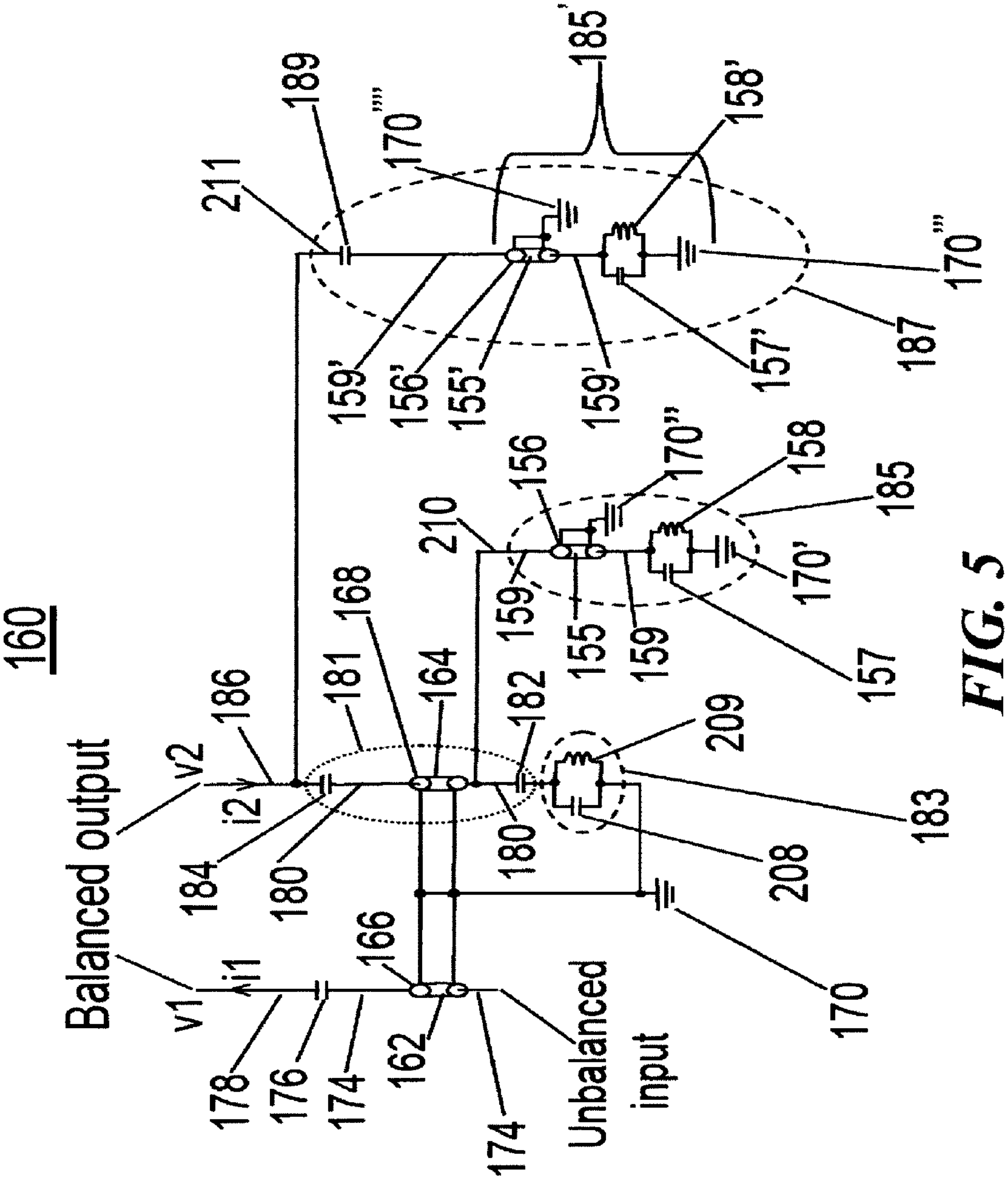
FIG. 5 is an electrical schematic view of a tunable multiband coaxial balun according to this invention.
Figure 6:
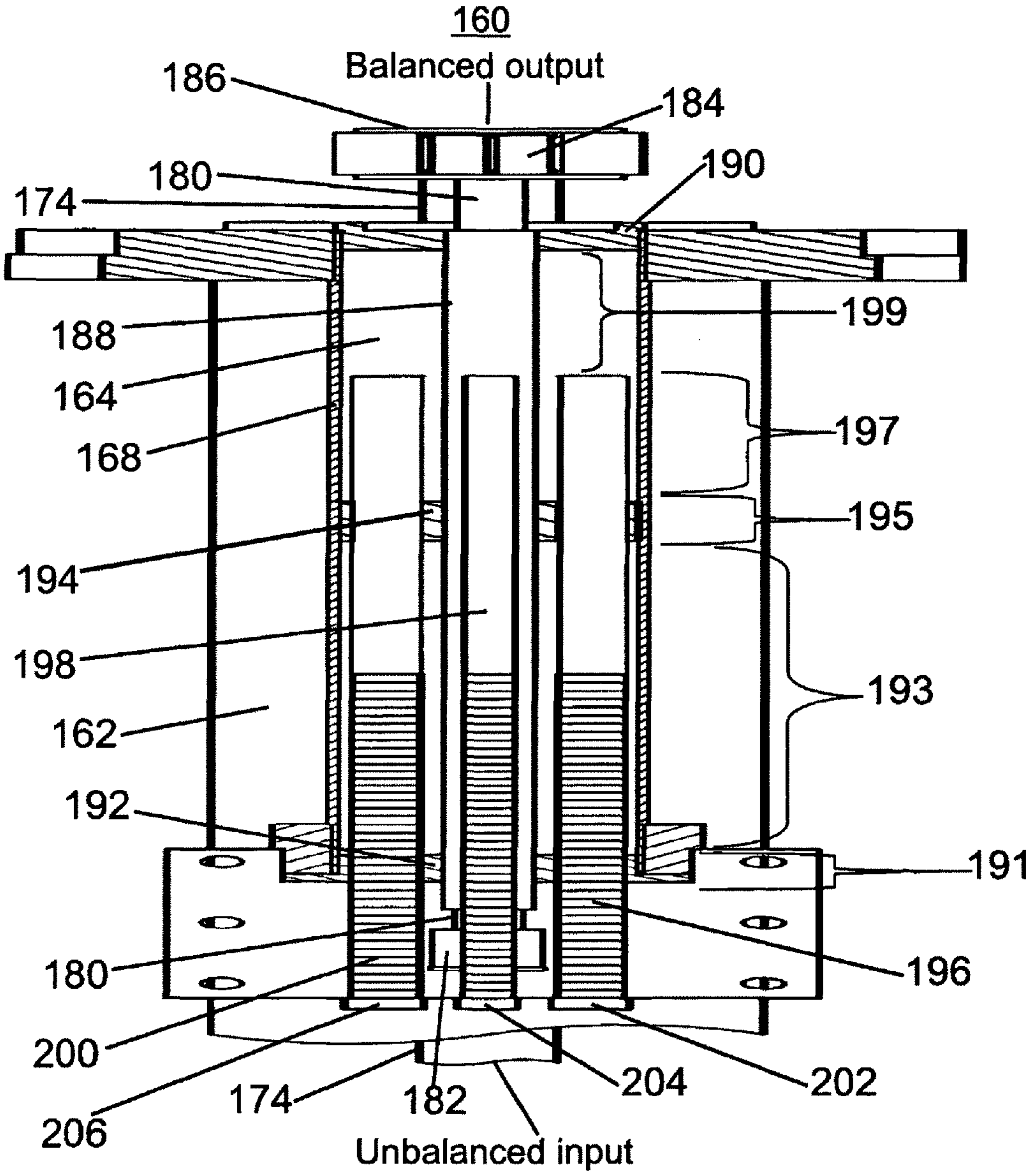
FIG. 6 is a mechanical diagrammatic cross-section elevational view of the dual frequency version of the balun of FIG. 5.

The third improved balun, multi-band tunable coaxial balun 160 shown in FIGS. 5 and 6 includes a segmented main transmission line 162, as discussed in FIGS. 16-20, and an adjustable transmission line (aTL) 164.

Unbalanced input is provided at the center conductor 174 of the segmented main transmission line 162. The other end of center conductor 174 is connected to capacitor 176 which provides one of the balanced output terminals at 178. The center conductor 180 of the adjustable transmission line 164 is connected through capacitor 182 and low frequency trap 183 to ground 170, when there are three channels. The other end of center conductor 180 is connected to capacitor 184 and constitutes the other balanced output terminal 186. In FIG. 6, the segmented main transmission line 162 and adjustable transmission line 164 are physically side by side, but particularly in FIG. 6 the main transmission line 162 is behind adjustable transmission line 164 which is shown in a cross sectional view. Center conductor 180 is surrounded by insulating sleeve 188, a top spacer 190, a bottom spacer 192, and dielectric rod guide 194. Threaded dielectric rods 196, 198, and 200 are received in spacer 192 and dielectric rod guide 194 and are moved to and fro, up and down in FIG. 6 by screw adjustment devices 202, 204, 206, respectively, shown simply schematically. Insulating sleeve 188 is optional. It has two purposes: to avoid arcing or corona discharging at high power and to increase the dielectric constant of the aTL 164 so that its length can be reduced. If space is not an issue, the cross-section of aTL 164 can be expanded to reduce the risk of arcing and corona discharging and to raise efficiency.

To balance three frequencies, it is necessary to include the low frequency trap or band stop filter 183 and either the impedance module 185 or low frequency module 187. Generalizations to more frequencies are analogous.

The low frequency trap or band stop filter 183 comprises capacitor 208 and inductor 209 connected in parallel. One end of 183 is grounded and the other end is connected to capacitor 182 at the bottom end of the tunable balance module 181.

The impedance module 185 consists of transmission line 155 whose electrical length is around ¼ times the wavelength of the high frequency, and a middle frequency band-stop filter, connected in series. This middle frequency band stop filter comprises capacitor 157 and inductor 158 connected in parallel, and can also be in any circuit configuration having a high impedance at middle frequency and low impedance at high and low frequencies. One end of inner conductor 159 of transmission line 155 is connected to the ground through the middle frequency band-stop filter, and the other end is connected to the top of capacitor 182.

The outer shields 166, 168, 156 and 156' of transmission lines 162, 164, 155 and 155' are grounded.

189 is a large capacitance capacitor which has low impedance at high and middle frequencies.

The low frequency module includes an impedance module 185' which has the same structure as 185. The top end of 185' is connected through capacitor 189 to the top of capacitor 184 at the top end of tunable balance module 181.

The ends 210, 211 of the impedance module 185 and low frequency module 187 have high impedances at high and middle frequencies. At low frequency, the ends 210 and 211 have low inductive and capacitative impedances, respectively. These impedance differences keep the rest of the circuit from being affected by the impedance module 185 or low frequency module 187, when there are three channels.

Capacitor 176 is the impedance matching capacitor for the middle frequency (and the low frequency when there are three channels) to improve the transmission efficiency.

With adjustment, the reactances at the output ends of capacitors 176 and 184 have the same amplitude (equal to half of the magnitude of the load impedance) but opposite in sign. Since the output currents i1 and i2, are then the same, the potentials v1 and v2 at the output ends of capacitors 176 and 184 should also be of equal amplitude but opposite sign. The unbalanced input has thus been converted to balanced output. As for the previous baluns, the function of the balun can be reversed. That is the balanced output could be a balanced input and the unbalanced input could be an unbalanced output.

At high frequency, Capacitors 176, 182, 184 and 208 have negligible reactance. The aTL 164 behaves like a transmission line shorted at the bottom. The impedance is transformed along the transmission line to yield a negative reactance at the other end. The aTL 164 has a total length of ¼ to ⅜ times the wavelength of high frequency.

Referring again to FIGS. 5 and 6, the actual length of the aTL 164 can be adjusted to accomplish coarse adjustments. That is, the longer 164, the less negative the reactance above capacitor 184. The fine adjustment is achieved by adding dielectric to 164 or removing it. Generally due to the dielectric members 192, 194, 190 and dielectric rods, there are "n" dielectric members resulting in "n+1" transmission line sections 191, 193, 195, 197, 199. Dielectric is moved into or out of the aTL by turning the threaded dielectric rods 196, 198, 200, see particularly FIG. 6. When the dielectric is moved into 164, the sections 191, 193, 195, 197, 199 with and without threaded dielectric rods inside become longer and shorter, respectively. As a result the electrical length of 164 is effectively increased and the reactance above capacitor 182 becomes less negative. The dielectric rod guide 194 can also be moved toward capacitor 184 to make the reactance above capacitor 184 less negative for fine adjustment.

At middle frequency, the adjustment of the aTL 164 is less effective in changing the reactance above capacitor 184. Therefore we need to adjust capacitors 182 and/or 184. The impedance above 184 becomes more capacitative when 182 or 184 is reduced.

For a dual band tunable coaxial balun, if the load has large impedance it is necessary to use both 182 and 184 to distribute the high voltage to avoid arcing. If the load has a medium or small impedance, either 182 or 184 alone suffices, but using both might reduce the standing wave ratio and thereby increase the efficiency.

At low frequency, there are two different choices.

If an impedance module 185 is connected to the top of 182, the low frequency trap gives the top of 182 a high impedance at low frequency, so that the balance at low frequency is not affected by the adjustment of 182. The impedance above 184 is adjusted with 184, becoming more capacitative when capacitance of 184 is reduced.

If a low frequency module 187 is connected to the top of 184, the low frequency trap gives the top of 184 a high impedance at low frequency, so that the balance at low frequency is not affected by the adjustment of tunable balance module 181. The impedance above 187 is adjusted with 189, becoming more capacitative when 189 is reduced.

The first case is easier to build and does not occupy any space around the output. But the second case has the advantage of totally independent tuning of the balance in all the channels.

When there are only two channels, the center conductor 180 of transmission line 164 is connected through capacitor 182 to ground 170. None of impedance module 185, low frequency module 187 and low frequency trap 183 is necessary anymore. The balances of the higher frequency and lower frequency channels are accomplished by following the above balancing principles and procedures for the high and middle frequencies of the three channel version.

With particular reference to FIG. 6, tunable coaxial balun 160 can balance two frequencies such as 400 MHz and 100 MHz. The adjustable transmission line 164 may, for example, be 220 mm. Capacitor 176 is the impedance matching capacitor for lower frequency and in these ranges may have a capacitance of 76 pF. Capacitors 182 and 184 are the balance adjustment capacitors for lower frequency and may have a capacitance in this embodiment of 56 pF and 34 pF respectively.

Figure 7:
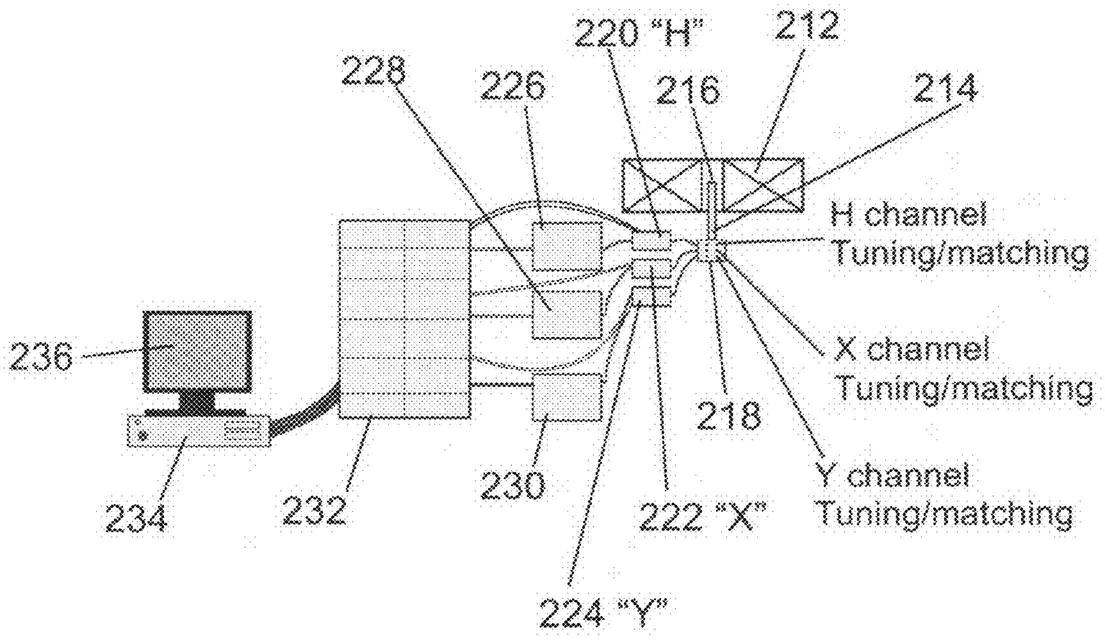
FIG. 7 is a schematic block diagram of an HXY triple resonance NMR system which can utilize the probes of FIGS. 8-11.

One application of the baluns described in FIGS. 1-6 is, for example, in an NMR system 210, FIG. 7, although they can be used in many other applications as indicated in the Background. Such an NMR system 210, FIG. 7, employs a powerful magnet 212 into which is entered the probe body 214 of probe 216 which also includes base 218. Base 218 may include, for example, three channel tuning/matching circuits, an H channel, an X channel and Y channel, for example. These are driven by respective H channel duplexer 220, X channel duplexer 222 and Y channel duplexer 224. Each of which in turn is driven by a power amplifier, again respectively, 226, 228, and 230. Channel duplexers 220, 222, and 224 receive input from power amplifiers 226, 228 and 230 to drive the tuning and matching circuits in the base 218 of probe 216. Channel duplexers 220, 222, and 224 also provide an output to console 232 which processes the data received from probe 216 and delivers it to computer 234 with display 236 in a well known manner.

Figure 8:
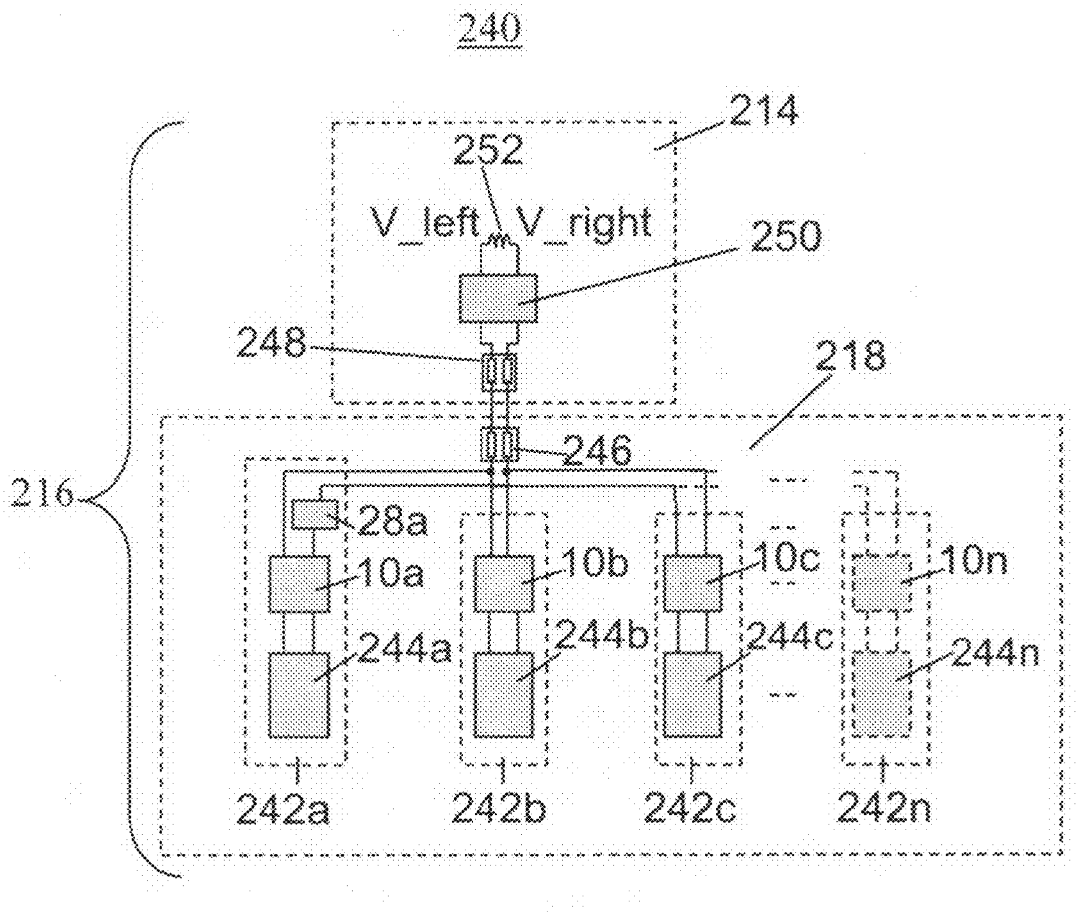
FIG. 8 is an electrical schematic diagram of a multi-resonant, clustered, pseudo-Marchand balun NMR probe according to this invention.

In further accordance with this invention the baluns of FIGS. 1-6 are employed in typically multi-resonant balun NMR probes. FIG. 8, shows a multi-resonant, clustered, improved or pseudo-Marchand balun NMR probe 240. In the base 218 of probe 216 there may be a number of channels 242*a*, 242*b*, 242*c*, . . . 242*n*, each including a pseudo-Marchand balun 10*a*, 10*b*, 10*c*, . . . 10*n*, and tuning and matching circuit 244*a*, 244*b*, 244*c*, . . . 244*n*. All of the pseudo-Marchand baluns 10*a*, 10*b*, 10*c* . . . 10*n*, connect to a common null point module 246, as described in more detail with reference to FIGS. 22-24, which is also in base 218. One of the pseudo-Marchand baluns may include in-line filter 28*a* as referred to previously and described in more detail with reference to FIG. 21. In-line filter 28*a* as previous explained functions to improve isolation and is usually placed as close to the common null point modules 246 as possible and associated with the nosiest channel. Probe body 214 of probe 240 includes a balanced pair of segmented main transmission lines 248, at the proximate end of probe body 214, described in more detail with reference to FIGS. 16-20, and a fine balance and impedance adjustment module 250, as explained in more detail with reference to FIGS. 12-15. Attached to the fine balance and impedance adjustment module 250 at the distal end of probe body 214 is sample coil 252. Each channel 242*a*, 242*b*, 242*c*, . . . 242*n*, is tuned to its working frequency, such as 500 MHz, 125 MHz, 50 MHz and matched to 50 ohms by its tuning and matching capacitor in the tuning and matching circuit 244*a-n*. The unbalanced RF input to each channel is converted by the pseudo-Marchand baluns 10*a-n* and transmitted through the common null point modules 246, balanced pair of segmented main transmission lines 248, and fine balance and impedance adjustment module 250, to the sample coil 252 with balanced voltage. That is, with the potentials of both ends V_left and V_right, that have the same magnitude and opposite phases. The sample coil 252 delivers the RF energy to the sample and picks up RF signals emitted by the sample. The latter are transmitted through the fine balance and impedance adjustment module 250, balanced pair of segmented main transmission lines 248, and common null point modules 246, to the baluns 10*a*-10*n*, which reconvert them and send them on to the duplexers 220, 222, 224, FIG. 7.

Figure 9:
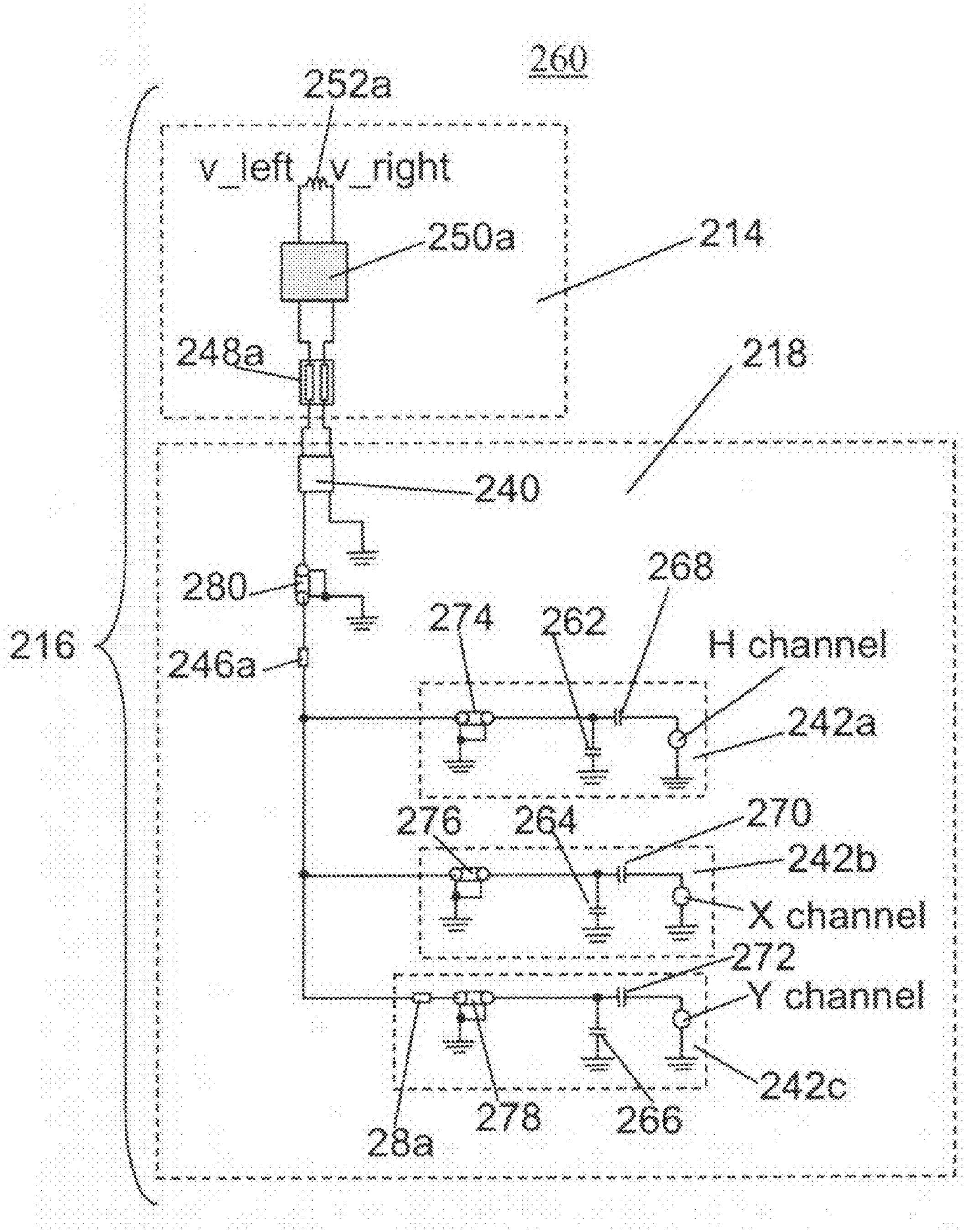
FIG. 9 is an electrical schematic diagram of a multi-resonant, compound balun NMR probe according to this invention with the compound balun near the tuning and matching modules.

In another NMR probe according to this invention, multi-resonant compound balun NMR probe 260, FIG. 9, multi-frequency compound balun 240 is disposed in base 218 near the tuning and matching modules 242*a*, 242*b* and 242*c*. Capacitors 262, 264, and 266 are tuning capacitors of channels 242*a*, 242*b*, and 242*c* shown in here in greater detail, also referred to as H channel, X channel and Y channel. Capacitors 268, 270 and 272 are matching capacitors for the H, 242*a*, X, 242*b*, and Y, 242*c* channels. Tuning/matching branch transmission lines 274, 276, 278 are also provided for each channel. An in-line filter 28*a* may also be provided to improve isolation and may be placed within one of the channels, e.g. Y channel 242*c*. Also in base 218 is a transmission line extension 280 which can be used for adapting the impedance of the balun 240 to the common point module 246*a*. At the proximal end of probe body 214 is a balanced pair of segmented main transmission lines 248*a* which is interconnected with multi frequency compound balun 240 in base 218 and to fine balance and impedance adjustment module 250*a* in probe body 214, which in turn is connected to sample coil 252*a* at the distal end of probe body 214. Each channel 242*a*, 242*b*, 242*c*, is tuned to its working frequency, e.g. 500 MHz, 125 MHz, 50 MHz and matched to 50 ohms by its tuning capacitor 262, 264, 266 and matching capacitor 268, 270, 272, all respectively. The unbalanced RF input to each channel is transmitted through common null point module 246*a* and transmission line extension 280, if it is used, to compound balun 240 which provides a balanced output to a balanced pair of segmented main transmission lines 248*a*, then through fine balance and impedance adjustment module 250*a* to sample coil 252*a*, so that the sample coil 250*a* is supplied with balanced voltage. That is, with potentials at both ends v_left and v_right that have the same magnitude and opposite phases. The sample coil 252*a* delivers the RF energy to the sample and picks up RF signals emitted by the sample. The latter are transmitted back through the fine balance and impedance adjustment module 250*a*, and a balanced pair of segmented main transmission lines 248*a* to balun 240 which converts it and sends it to duplexers 220, 222, 224, FIG. 7.

Figure 10:
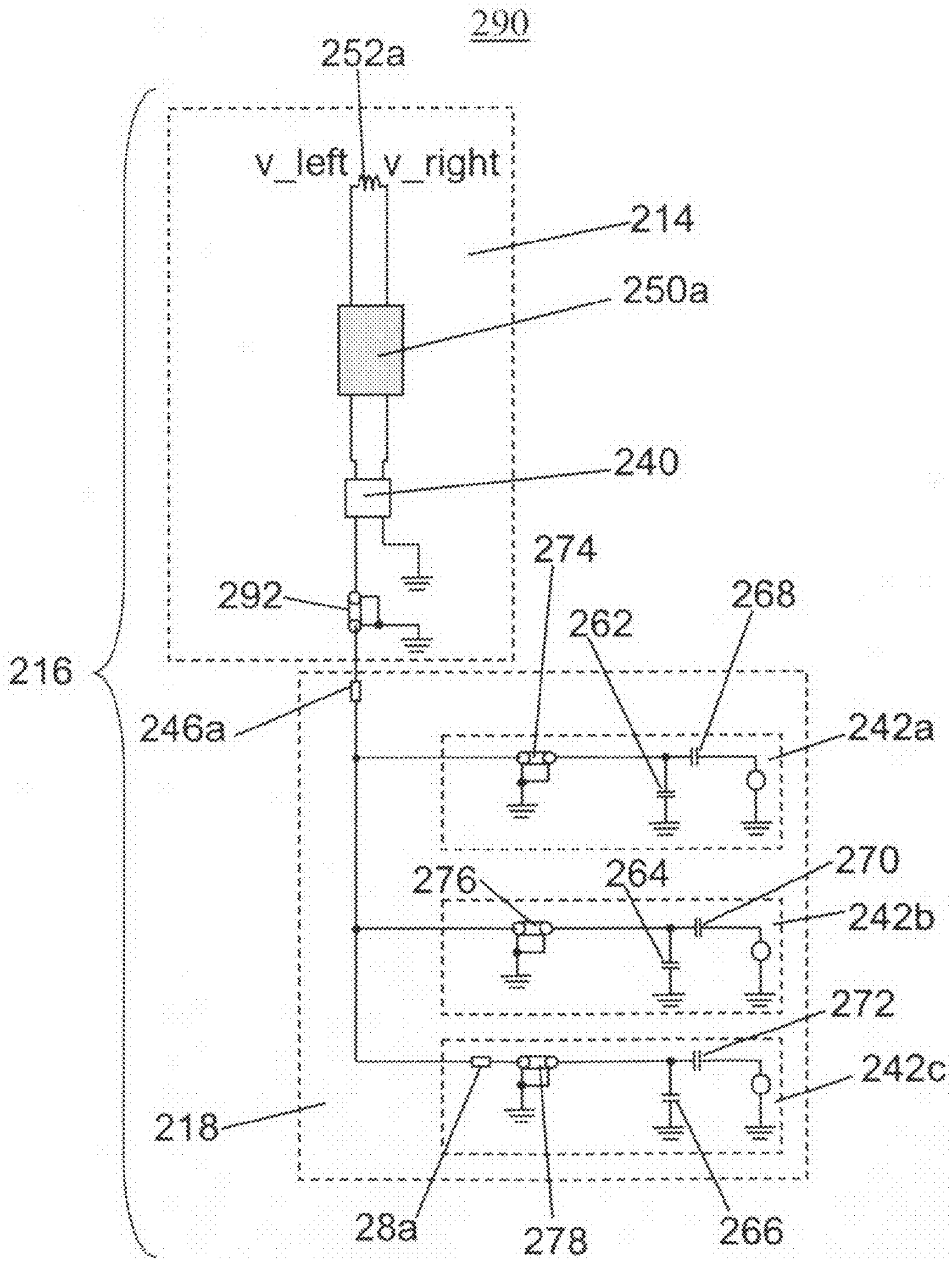
FIG. 10 is an electrical schematic diagram of a multi-resonant, compound balun NMR probe according to this invention with the compound balun near the sample coil.

The multi-resonant compound balun NMR probe 260 of FIG. 9, disposes the compound balun near the tuning and matching modules in base 218. In FIG. 10, the multi-resonant compound balun NMR probe 290 disposes the compound balun 240 near the sample coil 252*a* in probe body 214 of probe 216. Balun 240 is connected through a balanced pair of segmented main transmission lines 292 to common null point module 246*a* in base 218 which is connected to channels 242*a*, 242*b*, 242*c*, which are constructed in the same general manner as previously explained with respect to FIG. 9. Again here, the in-line filter 28*a* is optional but helps to improve the isolation of the channels. Each channel 242*a, b, c*, is tuned to its working frequency such as 500 MHz, 125 MHz, 50 MHz and matched to 50 ohms by its tuning capacitors 262, 264, 266 and matching capacitors 268, 270, 272. The unbalanced RF input to each channel is transmitted through the common null point module 246*a* and main transmission line 292 to compound balun 240 which converts it and supplies a balanced voltage to the sample coil 252*a* through the fine balance and impedance adjustment module 250*a*. That is, the potentials at both ends v_left and v_right have the same magnitude and opposite phases. Sample coil 252*a* delivers the RF energy to the sample and picks up RF signals emitted by the sample. The latter are reconverted by balun 240 and transmitted through the main transmission line 292 and common null point module 246*a* to duplexers, 220, 222, 224 shown in FIG. 7.

Figure 11:
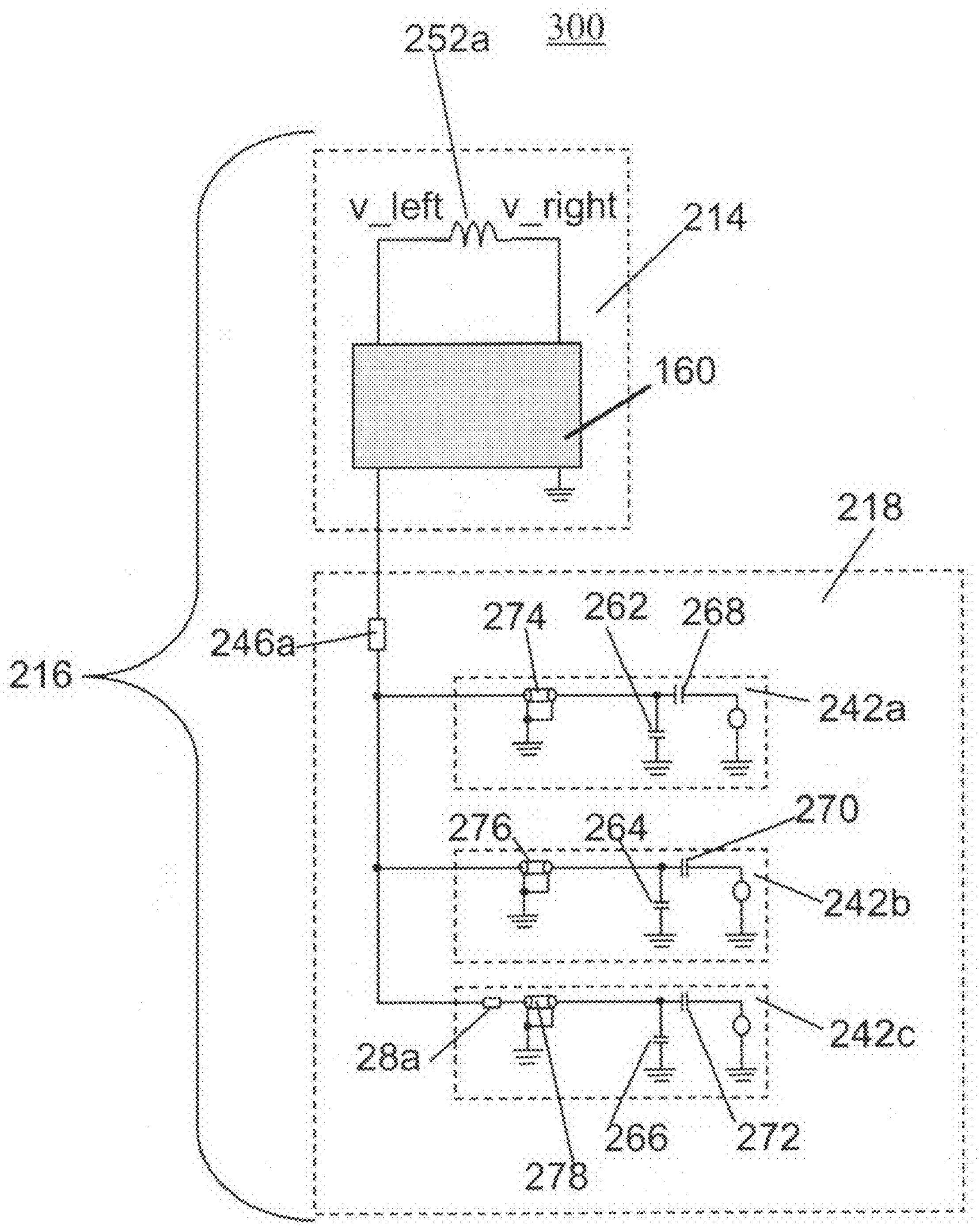
FIG. 11 is an electrical schematic diagram of a multi-resonant, tunable coaxial balun NMR probe according to this invention.

Another multi-resonant NMR probe 300 is shown in FIG. 11, where tunable coaxial balun 160 is disposed at the proximal end of probe body 214 and connects to sample coil 252*a* at the distal end. Tunable coaxial balun 160 is connected to common null point module 246*a* in base 218 which is connected to channels 242*a, b*, and *c*. Again each channel 242*a, b*, and *c* is tuned to its working frequency such as 400 MHz, 100 MHz, 40 MHz and matched to 50 ohms by its tuning capacitors 262, 264, 266 and matching capacitors 268, 270, 272. The unbalanced RF input to each channel 242*a, b*, and *c* is transmitted through the common null point module 246*a* to tunable coaxial balun 160 to supply the sample coil 252*a* with balanced voltage. That is, with potentials at both ends v_left, v_right that have the same magnitude and opposite phases. Sample coil 252*a* delivers the RF energy to the sample and picks up the RF signal emitted by the sample. The latter is reconverted by balun 160 and transmitted through the transmission lines and common null point module 246*a* to the duplexers 220, 222, 224, FIG. 7.

Figure 12:
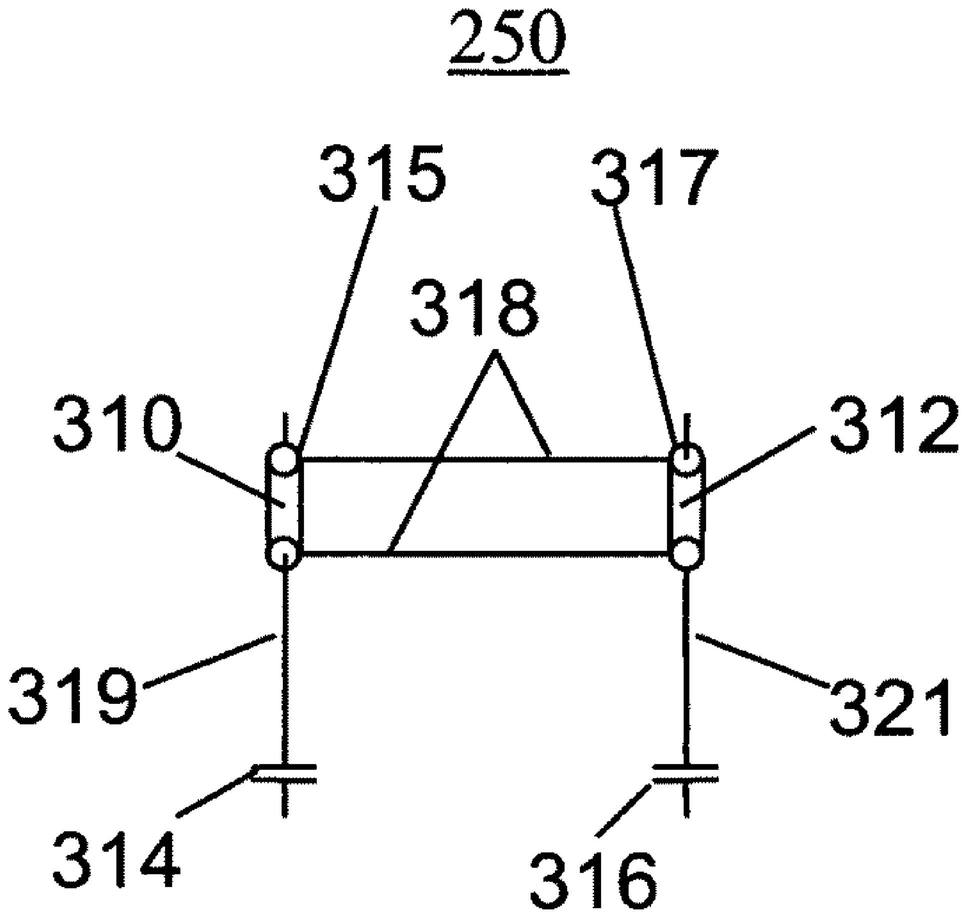
FIG. 12 is an electrical schematic view of a fine balance and impedance adjustment module according to this invention.
Figure 13:
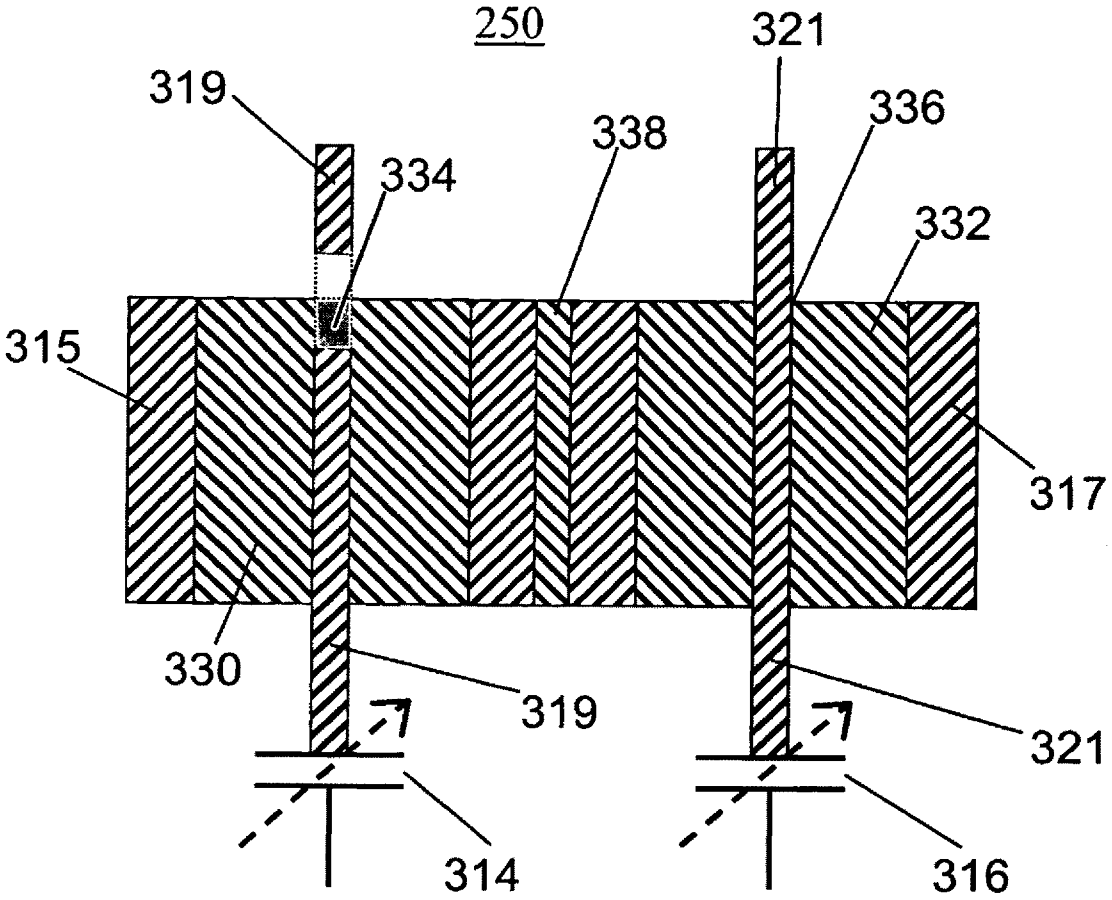
FIG. 13 is a mechanical diagrammatic cross-sectional elevational view of the fine balance and impedance adjustment module of FIG. 12.
Figure 14:
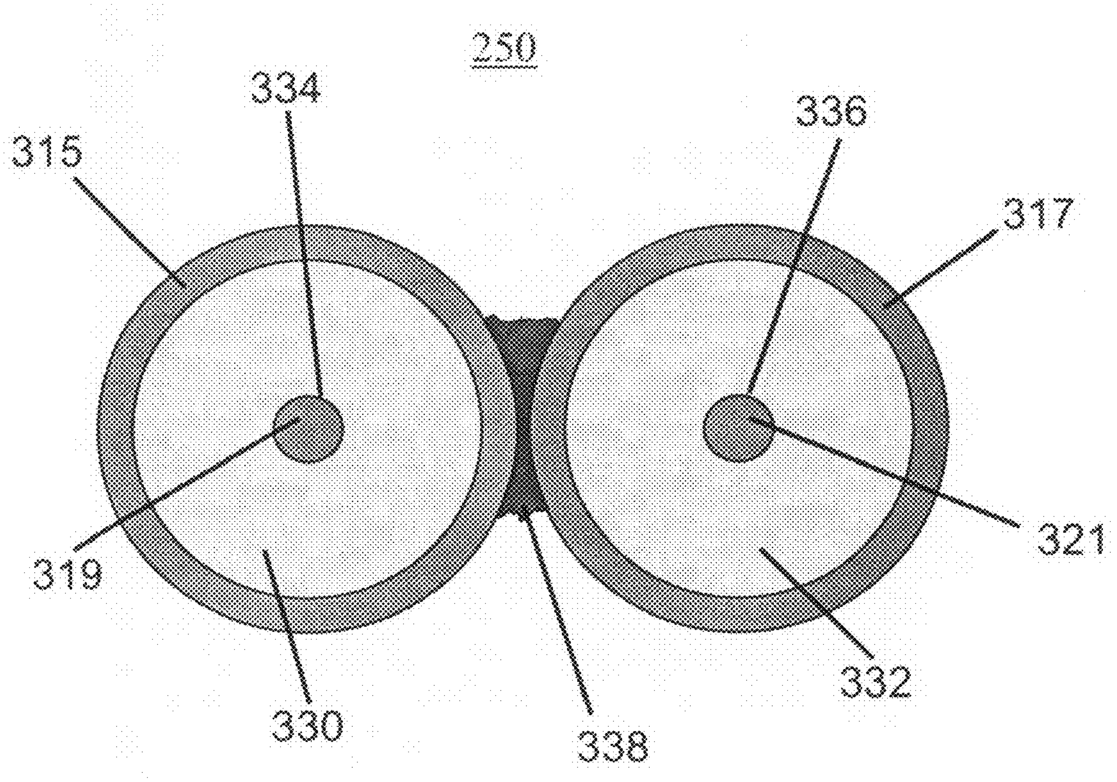
FIGS. 14 and 15 are top plan views of the module in FIG. 13 showing two different approaches to obtain a snug fit between center conductor and shield.
Figure 15:
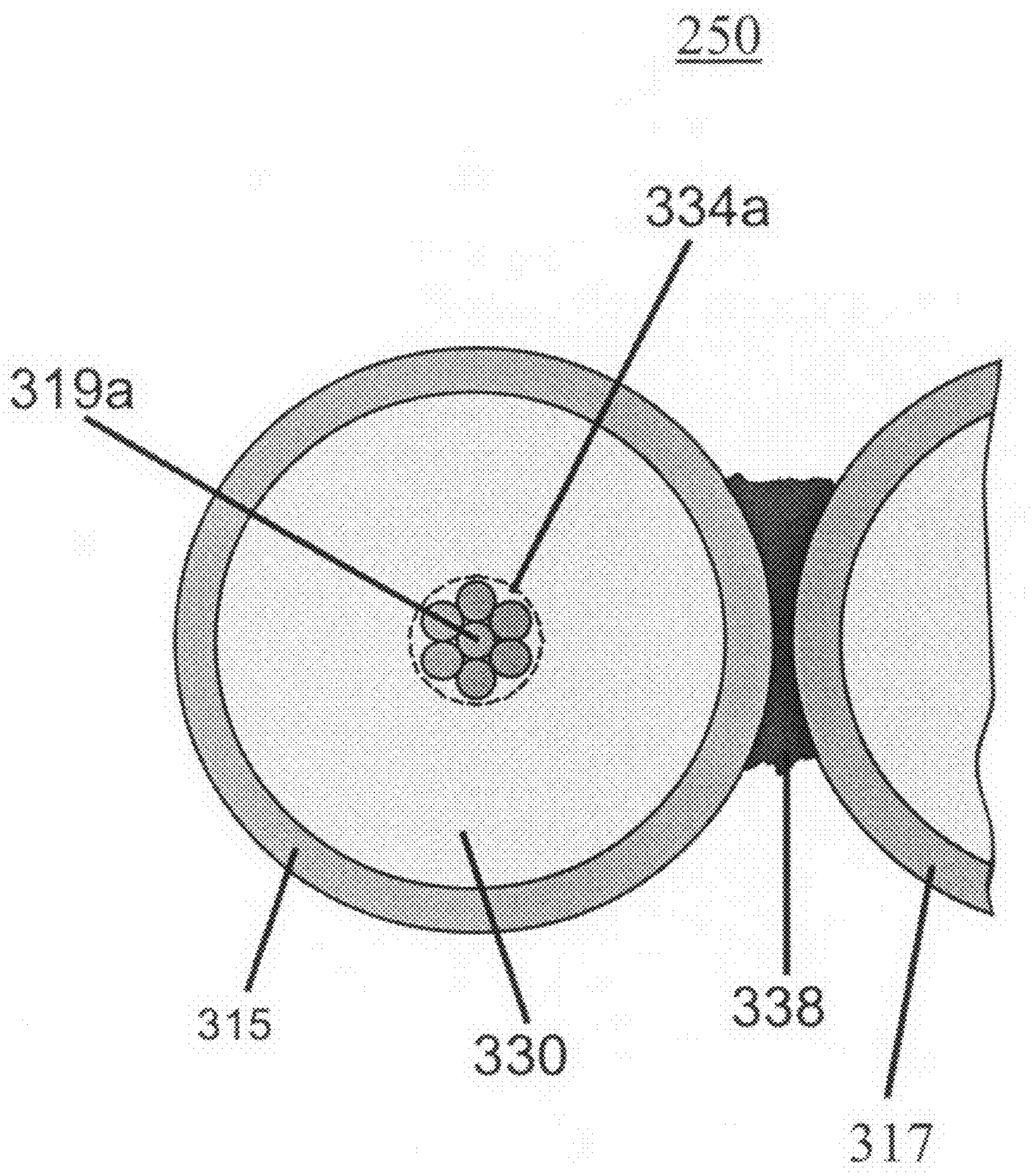

The fine balance and impedance adjustment module 250 referred to in FIGS. 8-10 can serve two purposes. It can provide fine adjustment of the balance to compensate for physical imperfections of the load or stray couplings from the environment, and it can provide fine adjustment of the impedance to improve the RF power transmission efficiency. As shown in FIG. 12 it may consist of two transmission lines 310, 312 with their center conductors connected to capacitors 314, 316 and their shields 315, 317 interconnected electrically and fixed together mechanically as shown by lines 318. The transmission lines may be two very short thin transmission lines, for example, 10 millimeters in length with a diameter of ⅛ of an inch whose shields are connected together as previously explained or they may be short, thin, twin-axial transmission line. Adjustment is made by moving the joined shields 315, 317 up and down along center conductors 319, 321. Capacitors 314, 316 are chosen to provide the proper balance and impedance match. For example, at 500 MHz they may be in the range of 140 pF. They may be variable as shown in FIG. 13. The center conductors 319 and 321, FIGS. 13-14, may be surrounded by dielectric filler 330, 332 which contain holes 334, 336 which snugly accommodate center conductors 319, 321 so that as the joined shields 315, 317, fixed together, for example, at the solder joint 338, move relative to center conductors 319, 321 they may allow movement and repositioning of center conductors 319, 321 and shields 315, 317. Alternatively, as shown in FIG. 15 with center conductor 319*a* being a plurality of strands having an eccentric cross section, the center conductor 319*a* may be rotated in the hole 334*a* to provide a sort of camming, locking action to hold the shield in its new position.

Figure 16:
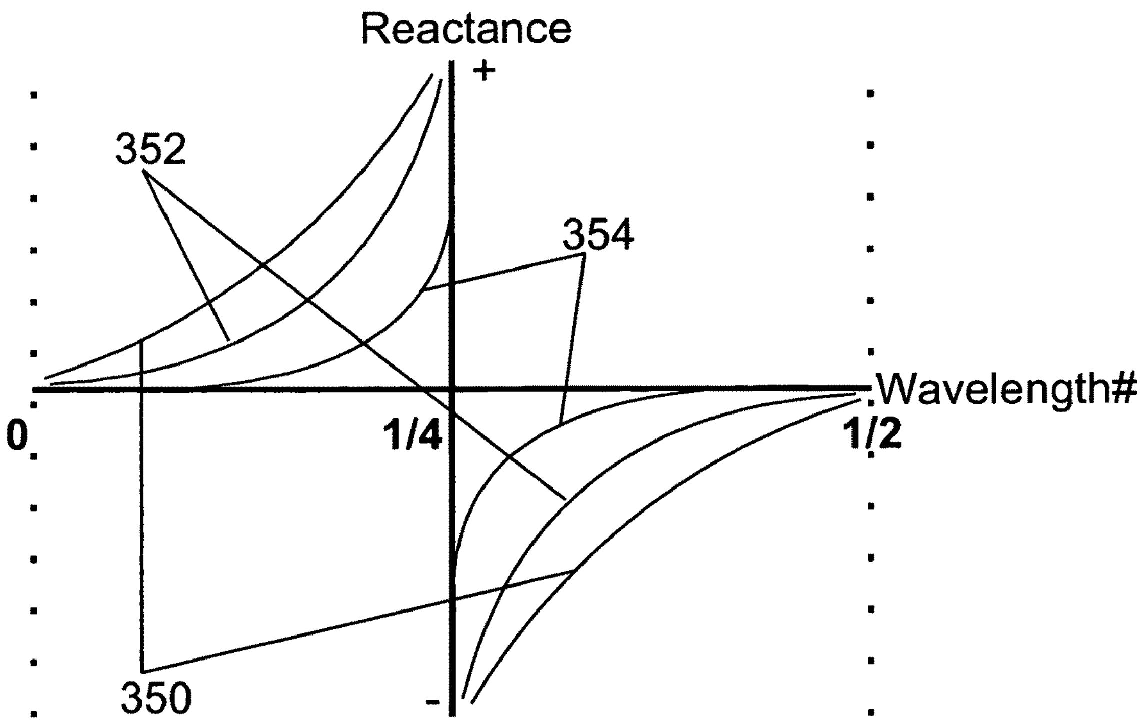
FIG. 16 PRIOR ART
FIG. 16 illustrates reactance transformation curves of transmission lines.
Figure 17:
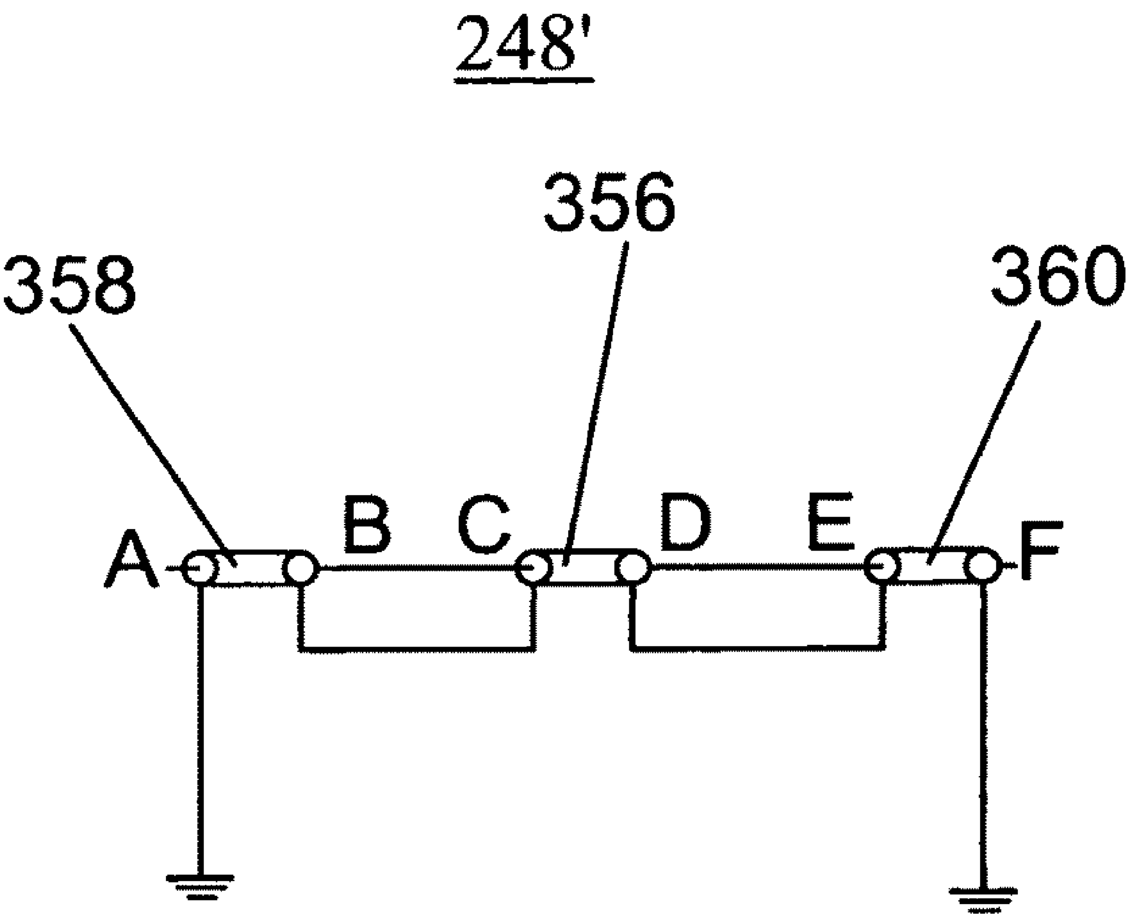
FIG. 17 is an electrical schematic diagram of a segmented transmission line.
Figure 18:
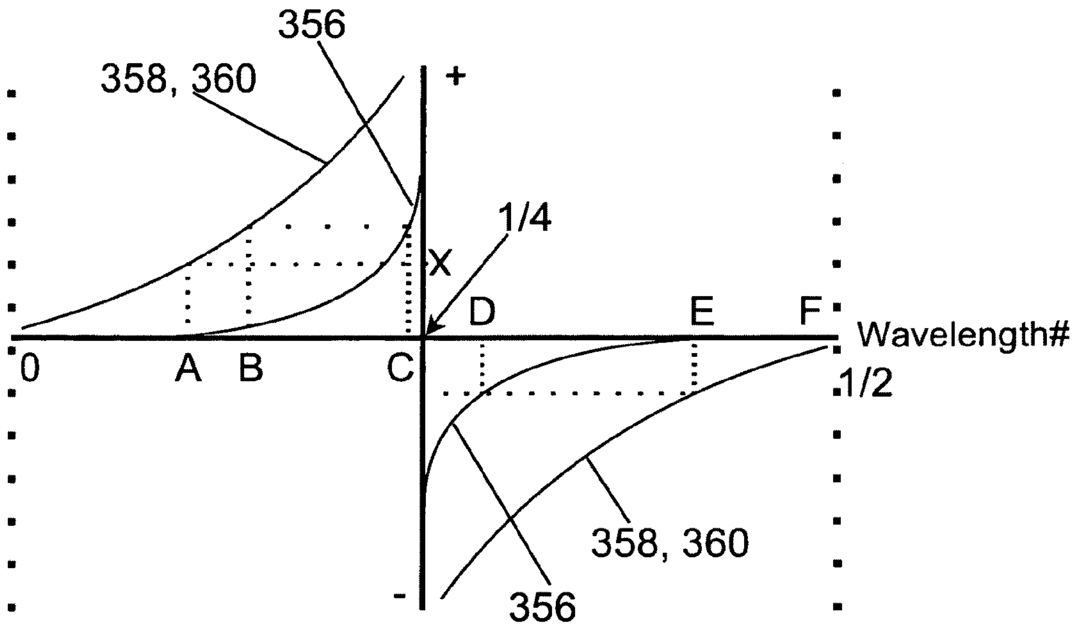
FIG. 18 illustrates reactance transformation in the shortening procedure based on FIG. 17.
Figure 19:
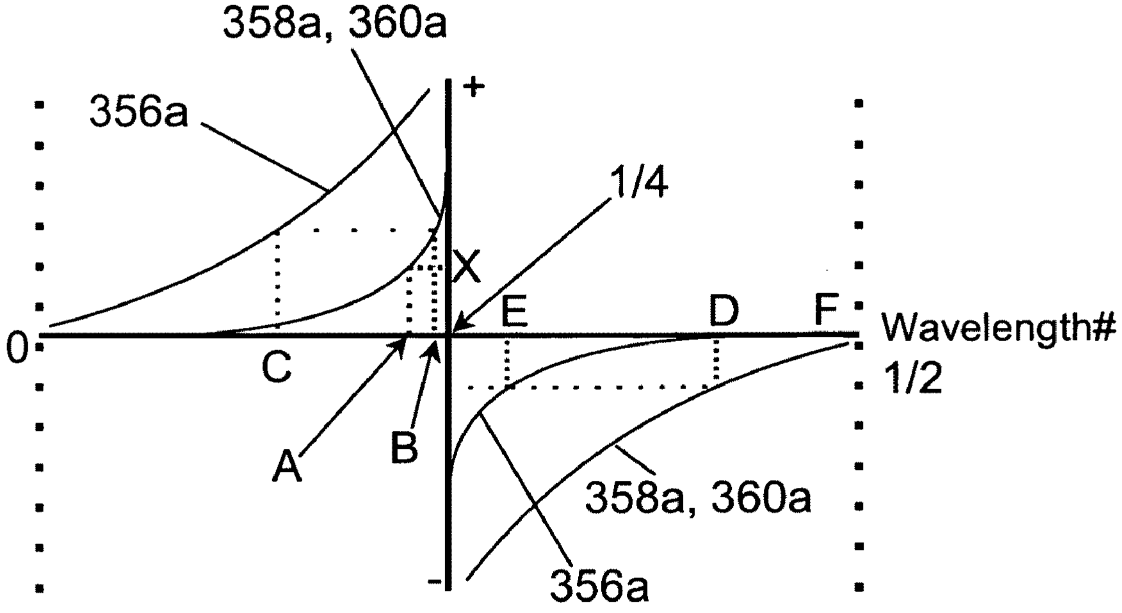
FIG. 19 illustrates reactance transformation in the lengthening procedure based on FIG. 17.
Figure 20:
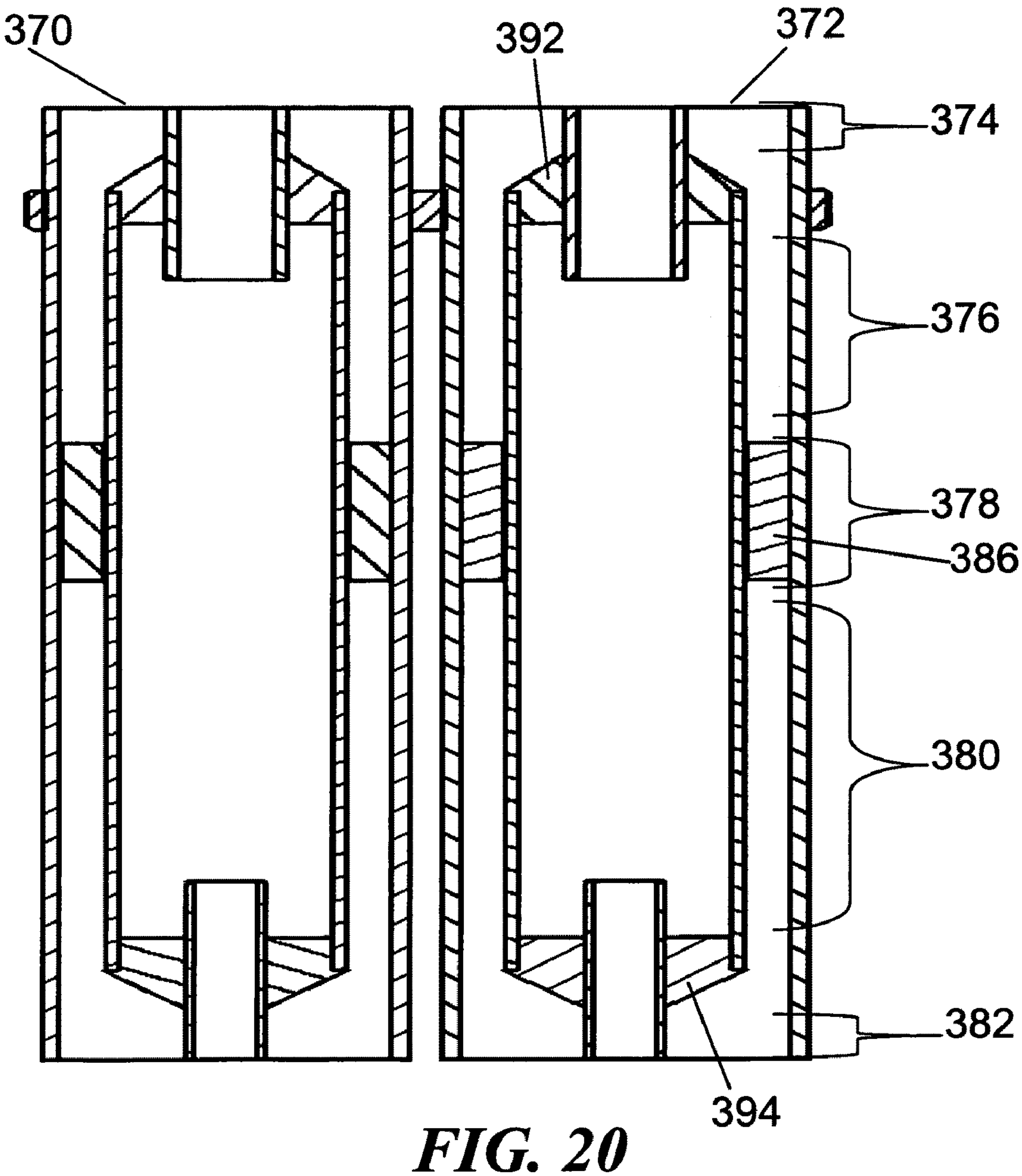
FIG. 20 is a mechanical diagrammatic cross-sectional elevational view of a pair of segmented transmission lines as in FIGS. 17.

The balanced pair of segmented main transmission lines 248 may be made by connecting transmission lines with different characteristic impedances in series. In this way, a given impedance transformation can be achieved with different physical lengths. This is useful in systems with stringent length constraints, for example, NMR probes, in order to accommodate the particular dimensions of the machine and environment, while still achieving the desired impedance. There is shown in FIG. 16 the reactance transformation curves of three transmission lines 350, 352, and 354 whose characteristic impedances are $Z_0A>Z_0B>Z_0C$. To shorten a main transmission line, a segmented transmission line 248', FIG. 17, may be made using three transmission line sections connected in series: a center transmission line 356 with characteristic impedance $Z_0C$, and two other equal transmission lines 358 and 360 at either end, with characteristic impedance $Z_0E$. Shortening is achieved with $Z_0E>Z_0C$, as shown in FIG. 18: whereas a uniform transmission line alone needs to have a length AF, the 3-segment transmission line shown in FIG. 17 achieves this transformation with a significantly shorter length of AB+CD+EF. Lengthening is achieved with $Z_0E<Z_0C$, as shown in FIG. 19: whereas a uniform transmission line alone needs to have the length AF, the 3-segment transmission line shown in FIG. 17 achieves this transformation with significantly longer length AB+CD+EF. The transformation principle is also applicable to combinations with just two sections of different characteristic impedances or with more than three sections. In NMR applications, medium or high characteristic impedance transmission lines are preferable to low characteristic impedance transmission lines because the former have less loss. FIG. 20 illustrates one example of a pair of segmented transmission lines 370, 372. Transmission line 372 has transmission line sections 374, 376, 378, 380, 382 which are defined by sliding dielectric sleeve 386" and tapers 392, 394. The characteristic impedances of transmission line sections 374, 376, 378, 380, 382 are $Z_0$382>$Z_0$374>$Z_0$380=$Z_0$376>$Z_0$378. The sliding electric sleeve 386 is for the fine adjustment of the impedance transformation. Tapers 392, 394 reduce the electric field strength at the connections between different sections to avoid arcing, corona discharging and breakdown.

Figure 21:
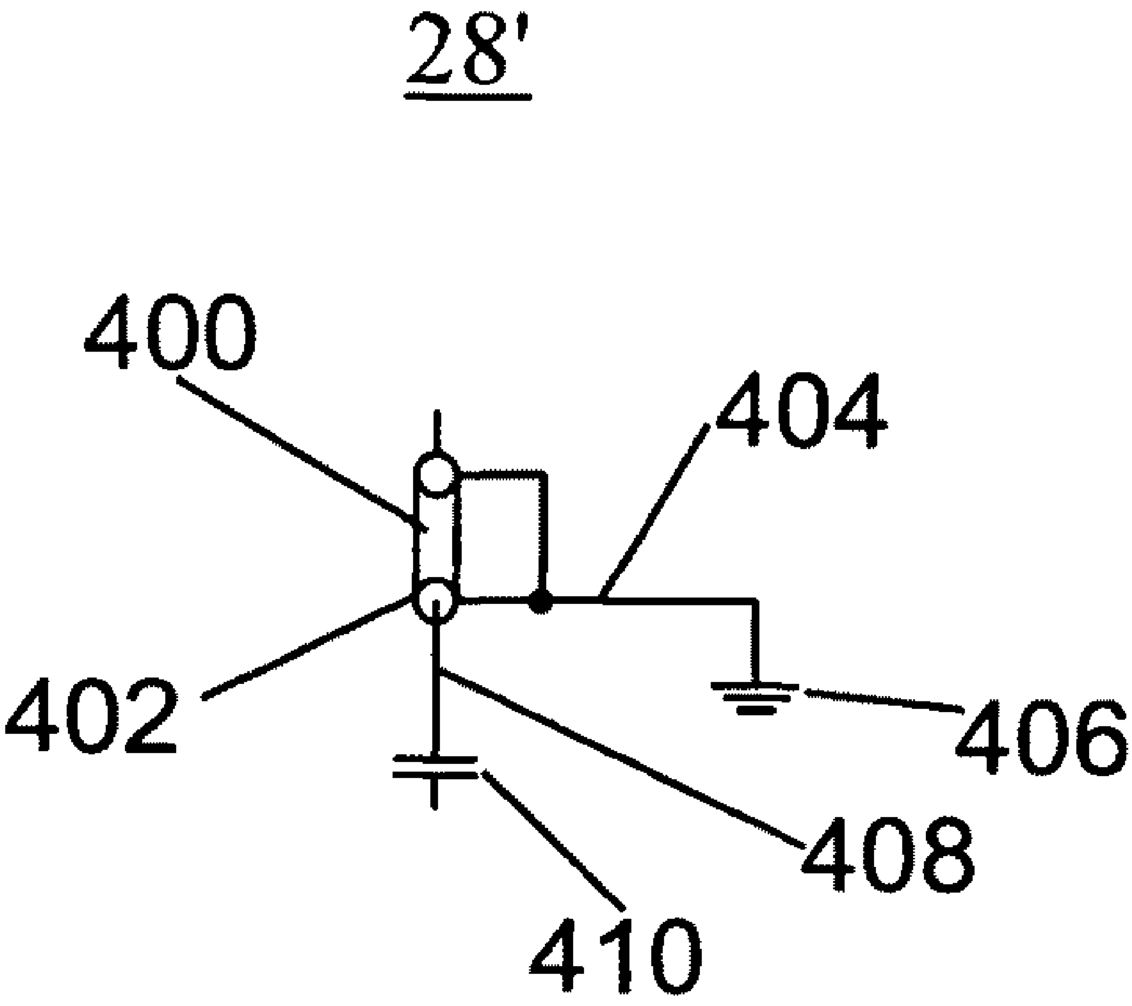
FIG. 21 is an electrical schematic view of an in-line filter.

The in-line filter referred in FIGS. 1, 2, 8-11 is shown in more detail in FIG. 21 where in-line filter 28' includes a transmission line 400 including a shield 402 connected by lines 404 to ground 406 and center conductor 408 which is connected to capacitor 410. Capacitor 410 and inner conductor or center conductor 408 are connected in series. At frequencies such as 50 MHz, one of the ends of the in-line filter may be at a null point, and both ends of the in-line filter have zero impedance. At other frequencies, such as 500 MHz, 125 MHz, in-line filter 28' has a large impedance at the end connected to the null point and therefore filters out those frequencies.

Figure 22:
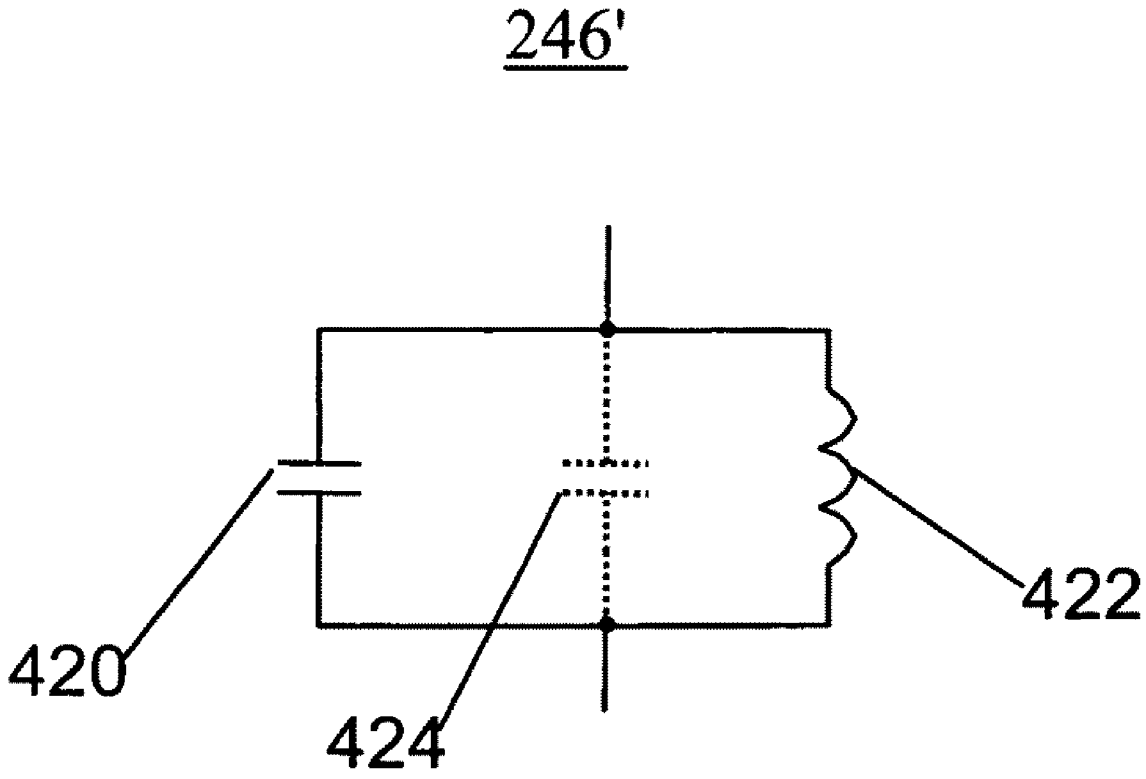
FIG. 22 is an electrical schematic view of a common null point module.

Common null point module 246 referred to in FIGS. 8-11 is shown in more detail in FIG. 22, as including a capacitor 420 and inductor 422. The common null point module 246' zeros the impedances at the operating frequencies, such as 500 MHz, 125 MHz, 50 MHz, so that channels will share the same null point. This improves the isolation between the channels resulting in improved efficiency and sensitivity. The fundamental unit of a common null point module is a combination of inductor 422 and capacitor 420, or there may be a capacitor set including capacitor 420 and another capacitor 424 connected in parallel. Common null point modules for operating four frequencies, FIG. 23, and up to five frequencies, FIG. 24, include additional components. Common null point module 246" for accommodating four operating frequencies includes two paralleled capacitor and inductor combinations 430 and 434, 432 and 436, connected in series. For five operating frequencies, common null point module 246'", FIG. 24, includes two paralleled capacitor and inductor combinations 430 and 434, 432 and 436, connected in series, with an additional capacitor 438 connected to both ends in parallel.

Figure 25:
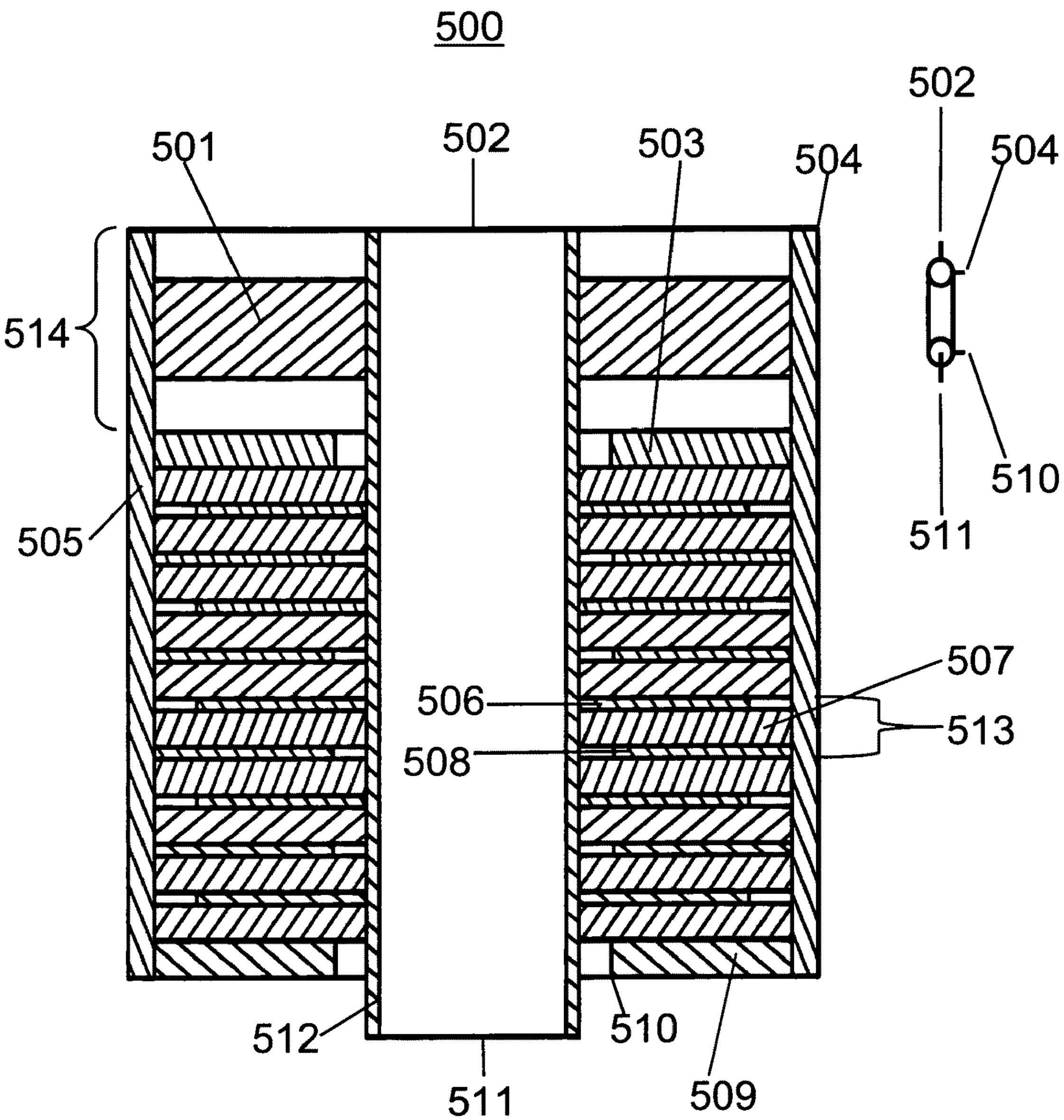
FIG. 25 is a multi-layer transmission line.

Multi-layer transmission line 500 referred to in FIG. 25 can provide a long electrical length with significantly shorter physical length than a uniform transmission line, so as to conform to stringent spatial constraints. Although the RF transmission efficiency of a multi-layer transmission line is low, due to internal dielectric members, it is an effective and compact choice for choking circuits, such as transmission lines 92, 94 and 96 in the present compound balun shown in FIGS. 3 and 4; a short multi-layer choking transmission line permits a shorter RF power bearing transmission line which reduces RF transmission loss. Multi-layer transmission line 500 is also a compact and effective choice for the choking balun of high power RF circuit.

Multi-layer transmission line 500 incorporates a stack of metal (normally copper) disks that alternately make contact with the inner or outer sleeve of the transmission line, and are separated by dielectric material that makes contact with both sleeves. For example, metal disk 506 only contacts the outer surface of inner sleeve 512 and metal disk 508 only contacts the inner surface of outer sleeve 505. Dielectric disk 507 contacts both the outer surface of inner sleeve 512 and the inner surface of outer sleeve 505. Top disk 503 and bottom disk 509 only contact the inner surface of outer sleeve 505 and support metal disks and dielectric disks between them. Disks 506 and 508 with a dielectric disk 507 between them form a transmission line section 513 which is connected in series with neighbor similar transmission line sections. The top section 514 of this transmission line is a coaxial transmission line, formed by the inner surface of 505, outer surface of 512 and adjustable dielectric member 501, which is connected in series to the adjacent transmission line section.

All these sections, connected in series, constitute the multi-layer transmission line 500 of which 502 and 511 are the inner or center conductor nodes, while 504 and 510 are the outer conductor or shield nodes.

The dielectric material can be FR4, FR5, PTFE, KelF, Delrin or any other insulating material with small dielectric loss factor. The higher the dielectric constant of the dielectric, the longer the electrical length of the transmission line for a given physical length.

The greater the separation between disks 506 and 508, the higher the characteristic impedance of transmission line section 513.

Coarse adjustment of the electrical length can be achieved by adding or reducing the number of layers or transmission line sections, adjusting the separation between the metal disks, or changing the length of top section 514. Fine adjustment is accomplished by moving the dielectric 501 into or out of the top section 514. The electrical length increases as 501 is moved into 514.

The physical length of a multi-layer transmission line with a given electrical length is several percent of the physical length of a uniform transmission line with the same electrical length. This shortening is more significant at low frequencies.

At 50 MHz, a ¼ wavelength (or 90°) multi-layer transmission line can be made with inner and outer sleeve diameters of around 8 mm and 25 mm respectively, a 40 mm long top section containing a sliding Delrin dielectric, and 95 sections with metal and dielectric disks in each layer made from commercial double-sided copper-clad printed circuit board (laminate) with thickness about 1 mm. The total physical length of the multi-layer transmission line is only about 135 mm while a uniform transmission line needs to be about 1500 mm to have this electrical length.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An improved Marchand balun comprising:

a first defined length transmission line having a center conductor and a shield, said defined wavelength transmission line having a length greater than $$\left(\frac{n}{2}\right)\lambda$$

and less than $$\left(\frac{1}{4}+\frac{n}{2}\right)\lambda$$

where n is a whole number;

a second transmission line having a center conductor and a shield;

one end of the center conductors providing a balanced output/input, the other end of said second transmission line center conductor providing the unbalanced input/output;

the shield of each transmission line being connected to ground; and a capacitor interconnected between the other end of said first defined length transmission line and ground.

2. The improved Marchand balun of claim 1 in which said defined wavelength transmission line is less than ¼ wavelength.

3. The improved Marchand balun of claim 1 further including an in-line filter at the balanced output of said second transmission line.

4. A compound balun comprising:

a transmission line system having a center conductor and at least three concentric shields forming a first transmission line between said center conductor and said first shield, a second transmission line between said first and second shields, and a third transmission line between said second and third shields;

said first transmission line receiving unbalanced input/output having at least three multi-band frequency signals at one end and providing a multi-band balanced output/ input at the other; said second and third transmission lines forming a choke to suppress the common mode current in the shield of the first transmission line at high frequency.

5. The compound balun of claim 4 in which there is a fourth concentric shield forming a fourth transmission line between said third and fourth shields.

6. The compound balun of claim 4 further including a first reactive load between said second and third transmission lines.

7. The compound balun of claim 6 in which said first reactive load includes first and second sections spaced from each other about the periphery of said second and third shields.

8. The compound balun of claim 7 in which each said first and second section includes a reactive transmission line having one end of its center conductor connected to one of said second and third shields and one end of its shield connected to the other of said second and third shields, the other ends of said reactive transmission line's shield and center conductor being connected to a capacitor for adjusting the choke for middle and low frequencies, respectively.

9. The compound balun of claim 5 further including a second reactive load between said third and fourth transmission lines.

10. The compound balun of claim 9 in which said second reactive load includes third and fourth sections spaced from each other about the periphery of said third and fourth shields.

11. The compound balun of claim 6 in which each said third and fourth sections include a reactive transmission line having one end of its center conductor connected to one of said third and fourth shields and one end of its shield connected to the other of said third and fourth shields, the other ends of said reactive transmission line's shield and center conductor being connected to a capacitor for adapting the choke for low frequency.

12. The compound balun of claim 4 in which the space between said second and third shields includes a dielectric member.

13. The compound balun of claim 4 in which the space between said first and second shields includes a static dielectric member and a moveable dielectric member movable toward and away from said static dielectric member for adjusting the suppression of the common mode current at the highest frequency.

14. A tunable multi-resonant coaxial balun comprising:

a segmented main transmission line having an unbalanced input at one end and one of the balanced output terminals at the other;

an adjustable transmission line having an inner conductor and shield with at least one dielectric member movable to and fro longitudinally between the inner conductor and shield for defining at least two adjustable transmission lines sections and adjusting the dielectric constant thereof for varying the output impedance of the adjustable transmission line to match the output impedance of the main transmission line at high frequency.

15. The tunable coaxial balun of claim 14 in which there is a number, n, of said dielectric members defining a number, up to n+1, of adjustable transmission line sections.

16. The tunable coaxial balun of claim 14 further including a first and second capacitor at the output ends of each transmission line and/or a third capacitor connected between the input end of the adjustable transmission line and ground for adjusting the adjustable transmission line to match the output impedance of the segmented main transmission line at lower frequency when there are two channels.

17. The tunable coaxial balun of claim 16 in which the adjustable transmission line and the second and/or third capacitors define a tunable balance module, further including a low frequency trap and either an impedance module or a low frequency module, connected respectively to the bottom or top of the tunable balance module, for adjusting the output terminal at the top of the tunable balance module to match the output impedance of the segmented main transmission line, along with the said first and/or second capacitor at the output ends of said segmented main transmission line and adjustable transmission line, at the lowest frequency, when there are three channels.

18. A multi-resonant pseudo-Marchand balun NMR probe comprising:

a base including at least one pseudo-Marchand balun, and a tuning and matching circuit associated with each pseudo-Marchand balun, each said multi-resonant pseudo-Marchand balun including:

a first defined length transmission line having a center conductor and a shield a second transmission line having a center conductor and a shield, one end of the center conductors provides a balanced output/input, the other end of said second transmission line center conductor providing the unbalanced input/output, the shield of each transmission line being connected to ground, and a capacitor interconnected between the other end of said first defined length transmission line and ground; and a probe body including a balanced pair of segmented main transmission lines at the proximate end interconnected with a sample coil at the distal end.

19. The multi-resonant pseudo-Marchand balun NMR probe of claim 18 further including in said base common null point modules connected to each of the outputs of said at least one pseudo-Marchand balun.

20. The multi-resonant pseudo-Marchand balun NMR probe of claim 18 in which in said probe body a fine balance and impedance adjustment module is interconnected between said balanced pair of segmented main transmission lines and said sample coil.

21. The multi-resonant Marchand balun NMR probe of claim 18 in which there are a plurality of said pseudo-Marchand baluns and said pseudo-Marchand balun NMR probe is multi-resonant.

22. A multi-resonant compound balun NMR probe comprising:

a base including at least one tuning and matching circuit; and a probe body including a segmented main transmission line interconnected to said at least one tuning and matching circuit; a multi-resonant compound balun connected to said main transmission line and a sample coil interconnected to said multi-resonant compound balun, said multi-resonant compound balun including:

a transmission line system having a center conductor and at least three concentric shields forming a first transmission line between said center conductor and said first shield, a second transmission line between said first and second shields, and a third transmission line between said second and third shields; said first transmission line receiving unbalanced input/output at at least three frequencies at one end and providing a multi-band balanced output/input at the other; said second and third transmission lines forming a choke to suppress the common mode current in the shield of the first transmission line at high frequency.

23. The multi-resonant compound balun NMR probe of claim 22 further including in said base a common null point module interconnected between said at least one tuning and matching circuit and said main transmission line.

24. The multi-resonant compound balun NMR probe of claim 22 further including in said probe body a fine balance and impedance adjustment module interconnected between said multi-resonant compound balun and said sample coil.

25. A multi-resonant compound balun NMR probe comprising:

a base including at least one tuning and matching circuit; and a multi-resonant compound balun interconnected therewith, said multi-resonant compound balun including:

a transmission line system having a center conductor and at least three concentric shields forming a first transmission line between said center conductor and said first shield, a second transmission line between said first and second shields, and a third transmission line between said second and third shields., said first transmission line receiving multi-band unbalanced input/output at one end and providing balanced output/input at at least three frequencies at the other end, said second and third transmission lines forming a choke to suppress the common mode current in the shield of the first transmission line at high frequency; and a probe body including a balanced pair of segmented main transmission lines at the proximate end and a sample coil at the distal end.

26. The multi-resonant compound balun NMR probe of claim 25 further including a common null point module interconnected between said at least one tuning and matching circuit and said multi-resonant compound balun.

27. The multi-resonant compound balun NMR probe of claim 25 further including a transmission line extension in series between said common point module and said multi-resonant compound balun.

28. The multi-resonant compound balun NMR probe of claim 26 further including a fine balance and impedance adjustment module interconnected between said sample coil and said main transmission line.

29. A multi-resonant tunable coaxial balun NMR probe comprising:

a base including at least one tuning and matching circuit; and a probe body having a multi-resonant tunable coaxial balun connected to said at least one tuning and matching circuit at the proximate end and a sample coil at the distal end, said multi-resonant tunable coaxial balun including:

a segmented main transmission line having an unbalanced input at one end and one of the balanced output terminals at the other;

an adjustable transmission line having an inner conductor and shield with at least one dielectric member movable to and fro longitudinally between the inner conductor and shield for defining at least two balun transmission line sections and adjusting the dielectric constant thereof for varying the output impedance of the balun transmission line to match the output impedance of the main transmission line at high frequency.

30. The multi-resonant tunable coaxial balun NMR probe of claim 29 further including in said base a common null point module interconnected between said at least one of said tuning and matching circuits and said multi-resonant tunable coaxial balun.

31. A fine balance and impedance adjustment module comprising:

a pair of transmission line sections having the same or different characteristic impedances and having their shields connected together;

a dielectric medium in each shield;

a center conductor passing through said dielectric medium and snugly fit therein to permit movement and repositioning of said center conductor relative to said shields for adjustment of high frequency impedance and balance; and a capacitor connected to each center conductor for adjusting lower frequency impedances and balances.

32. The fine balance and impedance adjustment module of claim 31 in which said capacitors are unequal.

33. The fine balance and impedance adjustment module of claim 31 in which said capacitors are variable.

34. A multi-layer transmission line comprising:

an inner metal sleeve;

an outer metal sleeve;

a longitudinally aligned stack of metal disks that alternately make contact with the inner or outer sleeve of the transmission line, and are separated by dielectric material that makes contact with both sleeves; and a top coaxial transmission line section.

35. The multi-layer transmission line of claim 34 further including an adjustable dielectric, which can be moved into and out of said top coaxial transmission line section to accomplish the fine adjustment of the electrical length.

* * * * *